United States Patent [19]
Ueda

[11] Patent Number: 5,671,319
[45] Date of Patent: Sep. 23, 1997

[54] COMPRESSION OF VIDEO AND AUDIO SIGNALS AND EXPANSION OF A COMPRESSED SIGNAL IN ACCORDANCE WITH AN IMAGE HF COMPONENT COMPRESSION FACTOR

[75] Inventor: Hiroaki Ueda, Tokyo, Japan

[73] Assignee: NEC Corporation, Tokyo, Japan

[21] Appl. No.: 98,876

[22] Filed: Jul. 29, 1993

[30] Foreign Application Priority Data

Jul. 31, 1992 [JP] Japan .................................. 4-205091

[51] Int. Cl.$^6$ .................................. H04N 5/928
[52] U.S. Cl. .................... 386/96; 386/104; 386/109; 386/112
[58] Field of Search .................... 358/310, 335, 358/341, 343; 348/390, 391, 392, 404, 405, 462; 360/19.1, 32; 386/95, 96, 98, 46, 104, 109, 111, 112, 125; H04N 5/928

[56] References Cited

U.S. PATENT DOCUMENTS

| | | | |
|---|---|---|---|
| 4,914,508 | 4/1990 | Music et al. | 348/391 |
| 4,963,992 | 10/1990 | Doi et al. | 358/335 |
| 5,032,927 | 7/1991 | Watanabe et al. | 358/335 |
| 5,043,798 | 8/1991 | Emori | 348/392 |
| 5,073,820 | 12/1991 | Nakagawa et al. | 348/403 |
| 5,148,272 | 9/1992 | Acampora et al. | 348/390 |
| 5,309,290 | 5/1994 | Sugiyama et al. | 360/32 |
| 5,333,212 | 7/1994 | Ligtenberg | 348/390 |

*Primary Examiner*—Thai Tran
*Assistant Examiner*—Huy Nguyen
*Attorney, Agent, or Firm*—Sughrue, Mion, Zinn, Macpeak & Seas

[57] ABSTRACT

On expanding, into a video reproduction and an audio reproduction synchronized with each other, a compressed video and audio signal comprising subsampled video and audio codes and indicating a frame rate and an indicated high frequency compression factor, presubsampled video codes are reproduced in compliance with the frame rate and decoded into decoded images. In compliance with a high frequency component compression factor selected from table factors in accordance with the indicated high frequency component compression factor, a dequantizer dequantizes the decoded images into dequantized images. In compliance with another high frequency component compression factor likewise selected, an inverse discrete cosine transform processing unit subjects the dequantized images to inverse discrete cosine transform to produce the video reproduction.

14 Claims, 17 Drawing Sheets

| PR | Ch | Cf | Cc |
|----|----|----|----|
| 1  | 1  | 0  | 7  |
| 2  | 1  | 1  | 7  |
| 3  | 2  | 1  | 7  |
FIG. 3
| SOI | Af | Vf | EOI | SOI | Af | Vf | EOI | SOI | ... | EOI | SOI | Af | Vf | EOI |
FIG. 4
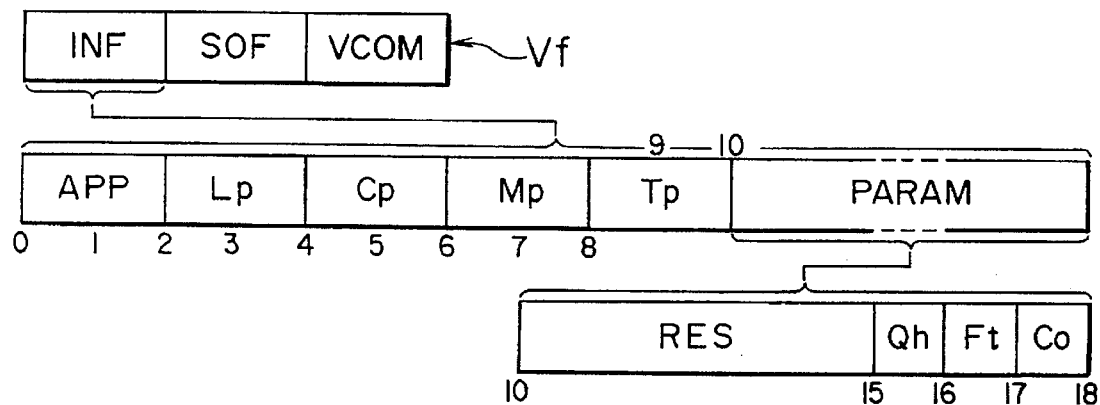
FIG. 5
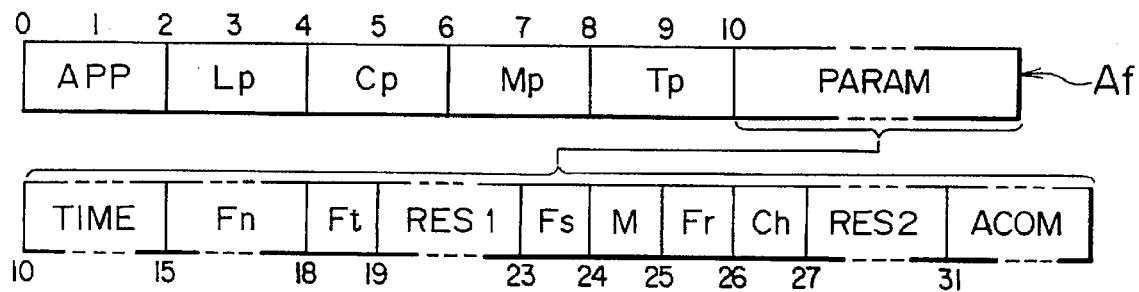
FIG. 6

COMPRESSION OF VIDEO AND AUDIO SIGNALS AND EXPANSION OF A COMPRESSED SIGNAL IN ACCORDANCE WITH AN IMAGE HF COMPONENT COMPRESSION FACTOR

BACKGROUND OF THE INVENTION:

This invention relates to a compressing device for compressing in accordance with a compression data table an original video signal and an original audio signal synchronized with each other collectively into a compressed video and audio signal and to an expanding device for expanding in compliance with the compression data table the compressed video and audio signal into a video reproduction and an audio reproduction which represent the original video and the original audio signals and are synchronized with each other.

It is desirable to compress an original video and an original audio signal of the type described by a compressing device in accordance with a compression data table into a highly compressed video and audio signal in order either to transmit such a compressed signal to a transmission medium or to store the compressed signal in a recording medium, such as a compact disk read-only memory (CD-ROM) or a hard disk. The compressed signal comprises a compressed video signal component and a compressed audio signal component which should be synchronized with each other. The original video signal comprises original images or represents the original images.

An expanding device is indispensable on using the compressed signal in a playback device by regenerating from the compressed signal in accordance with the compression data table a video reproduction and an audio reproduction representative of the original video and the original audio signals with synchronism established between the video and the audio reproductions. In the compressed signal, the compressed video signal component is represented by video codes. The video reproduction is regenerated from the video codes.

In the manner which will later be described in greater detail, such a compressing device comprises a table keeping arrangement for keeping a compression data table indicative of an image compression factor, an image compressing arrangement for compressing the original images into number compressed images in accordance with the image compression factor, a video encoding arrangement for encoding input images into video codes, and an audio encoding arrangement for encoding the original audio signal into audio codes representative of the compressed audio signal component. In a conventional compressing device, the number compressed images are used as the input images with the video codes used to represent the compressed video signal. That is, a supply arrangement supplies in this event the number compressed images to the video encoding arrangement as the input images.

In the conventional compressing device, the supply arrangement may preferably comprise a discrete cosine transform processing arrangement for subjecting the number compressed images to discrete cosine transform to produce discrete cosine transform processed images and a quantizing arrangement for quantizing the discrete cosine transform processed images into quantized images. In such an event, the supply arrangement supplies the quantized images to the video encoding arrangement as the input images.

The expanding device expands the video codes representative of the compressed video signal component and the audio codes representative of the compressed audio signal individually into the video reproduction and the audio reproduction. A conventional expanding device comprises a table keeping arrangement for keeping a compression data table indicative of the above-mentioned image compression factor, a video decoding arrangement for decoding the video codes into number reduced images, and an image interpolating arrangement for interpolating additional images in the number reduced images in accordance with the image compression factor to produce the video reproduction, and an audio reproducing arrangement for reproducing the audio reproduction from the audio codes.

In each of the compressing and the expanding devices, a random access memory is used in keeping various signals being processed during compression of the original video signal and during expansion of the video codes. Ordinarily, the random access memory does not process the signals with a sufficiently high speed. As a consequence, the original video signal and the video codes are processed at a slower rate than the original audio signal and the audio codes. This results in collapse of synchronism between the compressed video signal component and the compressed audio signal component and between the video reproduction and the audio reproduction. For example, it will be presumed that the random access memory deals with each image in five milliseconds. On processing various images at a frame rate of 30 images per second, the random access memory must deal with each image in about 28 milliseconds. If it takes about 50 milliseconds in processing each image, the compressed video signal component is produced about 22 milliseconds later than the compressed audio signal component. Furthermore, the discrete cosine transform processing arrangement and the quantizing arrangement are not operable rapidly enough.

SUMMARY OF THE INVENTION

It is consequently an object of the present invention to provide a compressing device capable of rapidly processing an original video signal into a compressed video signal component and to provide an expanding device capable of rapidly processing video codes representative of the compressed video signal component into a video reproduction representative of the original video signal.

It is another object of this invention to provide a compressing device and an expanding device which are of the type described and by which it is possible to keep synchronism between the video codes and audio codes produced from an original audio signal to represent a compressed audio signal component and between the video reproduction and an audio reproduction expanded from the audio codes to represent the original audio signal.

Other objects of this invention will become clear as the description proceeds.

In accordance with a general aspect of this invention, there is provided a video and audio signal compressing and expanding system for compressing an original video signal and an original audio signal synchronized with each other collectively into a compressed video and audio signal in compliance with a compression data table and for expanding the compressed video and audio signal in accordance with the compression data table separately into a video reproduction and an audio reproduction which represent the original video signal and the original audio signal and are synchronized with each other, wherein the compression data table indicates a high frequency component compression factor and a frame rate compression factor.

On setting forth a different aspect of this invention, it is possible to understand that a video and audio signal compressing device is for compressing an original video signal and an original audio signal synchronized with each other collectively into a compressed video and audio signal comprising a compressed video signal and a compressed audio signal synchronized with each other and includes table keeping means for keeping a compression data table, video encoding means for encoding input images into presubsampled video codes, and audio encoding means for encoding the original audio signal into audio codes used as the compressed audio signal.

In accordance with the different aspect of this invention, the above-understood compressing device comprises: (A) high frequency component compressing means for compressing high frequency components of the original images into high frequency component compressed images in compliance with a high frequency component compression factor; (B) supply means for supplying the high frequency component compressed images to the video encoding means as the input images; and (C) subsampling means for subsampling the presubsampled video codes in compliance with a frame rate compression factor into subsampled video codes used as the compressed video signal, with the compression data table made to indicate the high frequency component compression factor and the frame rate compression factor.

On setting forth the gist of a further different aspect of this invention, it is possible to understand that a compressed video and audio signal expanding device is for expanding a compressed video and audio signal separately into a video reproduction and an audio reproduction representative of original images of an original video signal and an original audio signal. The compressed video and audio signal is a succession of subsampled frames and indicates a frame rate compression factor and an indicated high frequency component compression factor. Each of the subsampled frames comprises a subsampled video code and a subsampled audio code synchronized with each other with high frequency component of the original images compressed in the subsampled video code.

In accordance with the further different aspect of this invention, the above-understood compressed video and audio signal expanding device comprises: (A) table keeping means for keeping a compression data table indicative of a plurality of high frequency component compression factors; (B) frame interpolating means for interpolating additional frames in the subsampled frames in compliance with the frame rate compression factor to produce presubsampled frames comprising reproduced video codes and reproduced audio codes into which the subsampled video codes and the subsampled audio codes of the subsampled frames are expanded; (C) audio decoding means for decoding the reproduced audio codes into the audio reproduction; (D) video decoding means for decoding the reproduced video codes into high frequency component excluded images; (E) high frequency component recovering means for recovering high frequency components of the high frequency component excluded images, in accordance with one of the high frequency component compression factors of the compression data table that is selected in accordance with the indicated high frequency component compression factor, to produce reproduced images; and (F) video reproducing means for reproducing from the reproduced images the video reproduction with synchronism kept between the video reproduction and the audio reproduction.

BRIEF DESCRIPTION OF THE DRAWING

FIG. 3 exemplifies a compression data table for use in the compressing device illustrated in FIG. 1 and in the expanding device depicted in FIG. 2;

FIG. 4 shows a format of a compressed video and audio signal produced by the compressing device depicted in FIG. 1 and supplied to the expanding device illustrated in FIG. 2;

FIG. 5 shows a format of a compressed video signal included in the compressed video and audio signal illustrated in FIG. 4;

FIG. 6 shows a format of a compressed audio signal included in the compressed video and audio signal illustrated in FIG. 4;

DESCRIPTION OF THE PREFERRED EMBODIMENT

Figure 1:
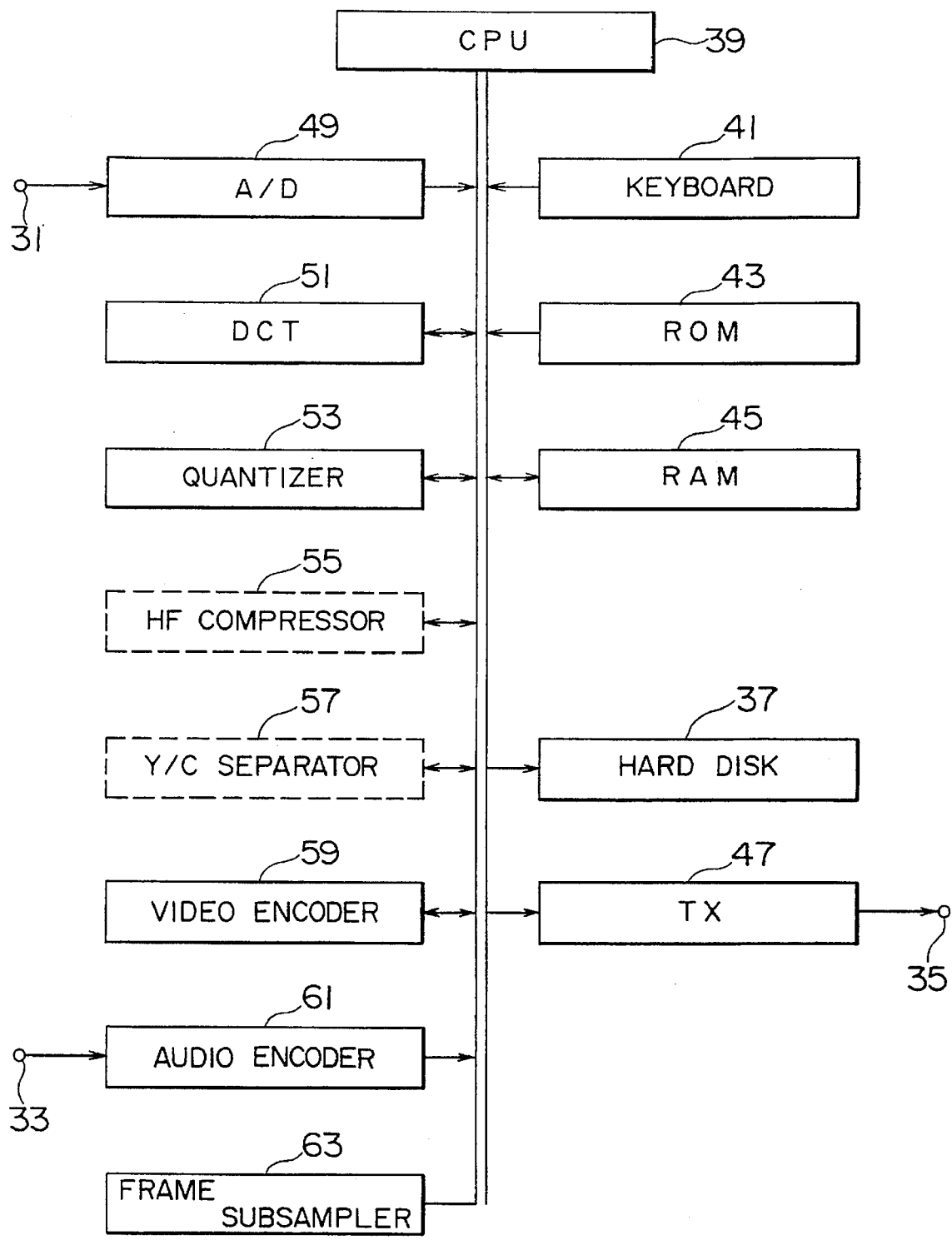
FIG. 1 is a block diagram of a compressing device for use as a counterpart of an expanding device according to an embodiment of the instant invention.

Referring to FIG. 1, a compressing device will first be described. The compressing device is for use in a video signal coding system standardized in compliance with ISO 10918-1 of the Joint Photographic Coding Experts Group (JPEG) and is for use as a counterpart of an expanding device which is for use also in the video signal coding system and is according to a preferred embodiment of the present invention.

The compressing device has a video signal input terminal 31, an audio signal input terminal 33, a compressed signal output terminal 35, and a site where a compressor hard disk 37 is located. The video signal input terminal 31 is supplied with an original video signal which may be an analog video signal and is either a color video signal or a monochromatic video signal. It will be assumed in the following that the original video signal is an analog color video signal unless otherwise specifically mentioned. The audio signal input terminal 33 is supplied with an original audio signal with which the original video signal is synchronized. From the compressed signal output terminal 35, a compressed video and audio signal is delivered to a transmission medium (not shown). The compressed video and audio signal comprises a compressed video signal or a compressed video signal component and a compressed audio signal or a compressed audio signal component which are synchronized with each other.

The compressing device comprises a compressor central processing unit (CPU) 39 for controlling a video and audio compression operation of the compressing device and a compressor keyboard 41 for specifying the operation. A compressor read-only memory (ROM) 43 is preliminarily loaded with a compression data table indicative of a plurality of compression factors comprising a high frequency component compression factor and a frame rate compression factor in the manner which will become clear as the description proceeds.

For read out and storage by the central processing unit 39, a compressor random access memory (RAM) 45 keeps various video and audio signals which will be described in detail in the following. Controlled by the central processing unit 39 and specified by the keyboard 41, the random access memory 45 delivers the compressed video and audio signal either to the hard disk 37 for storage or to a transmitter unit (TX) 47 for delivery to the compressed signal output terminal 35. A part of the random access memory 45 serves in this manner as a frame memory.

An analog-to-digital converter (A/D) 49 converts the analog video signal to a digital video signal for storage as a stored original video signal in the random access memory 45. The digital video signal and consequently the stored original video signal represents a succession of original images or video durations in successive time intervals of a common predetermined duration, such as a frame or a field of a television signal. In the manner known in the art, each original image of such a predetermined time duration is divided into a succession of original blocks, each consisting typically of eight by eight picture elements or dots.

Controlled by the central processing unit 39 and by the high frequency component compression factor read from the read-only memory 43, a forward discrete cosine transform (DCT) processing unit 51 subjects the original images to forward discrete cosine transform to produce forward discrete cosine transform processed images, in which high frequency components of the original images are compressed in accordance with the high frequency component compression factor. More particularly, the discrete cosine transform processing unit 51 first compresses the high frequency components of the original images with reference to the high frequency component compression factor to produce component compressed images. Subsequently, the discrete cosine transform processing unit 51 subjects the compressed images to the discrete cosine transform to produce the discrete cosine transform processed images. It is possible in this manner to carry out the discrete cosine transform in a short time.

Similarly controlled, a quantizer 53 quantizes the discrete cosine transform processed images into quantized images, in which the high frequency components of the original images are again compressed in accordance with the high frequency component compression factor. More specifically, the high frequency components of the original images need not be utterly compressed but may remain in the discrete cosine transform processed images as remaining frequency components. The quantizer 53 first compresses the remaining frequency components with reference to the high frequency component compression factor to produce remaining frequency component compressed images. Thereafter, the quantizer 53 quantizes the remaining component compressed images into the quantized images. It is possible with this to quantize the discrete transform processed images in a short time even without changing a quantization step to wider steps.

It is now understood that a combination of the discrete cosine transform processing unit 51 and the quantizer 53 serves as a high frequency component compressing arrangement for compressing the high frequency components of the original images in compliance with the high frequency component compression factor to produce the quantized images as high frequency component compressed images. In order to facilitate an understanding of the compressing device, the high frequency component compressing arrangement is depicted separately of the combination as a high frequency component (HF) compressing unit 55 by a dashed-line block.

When the analog video signal is a color video signal, the stored original video signal represents a succession of color images of picture elements which are featured by color components consisting, for example, of a luminance Y, a red color difference Cr, and a blue color difference Cb, and are divisible into color blocks consisting of luminance blocks, red color difference blocks, and blue color difference blocks. In this event, the discrete cosine transform processing unit 51 is controlled by the central processing unit 39 and specified by the keyboard 41 to preliminarily separate the color images into luminance images, red color difference images, and blue color difference images.

Subsequently, the discrete cosine transform processing unit 51 processes the color images into color processed images of a selected color component which is selected from the color components to always comprise the luminance in compliance with a color component compression factor read from the compression data table of the read-only memory 43. As a consequence, the color processed images always comprise the luminance images. Depending on the color component compression factor, the color processed images may alternatively be the red color difference images. As a further alternative, the color processed images may be the blue color difference images.

The discrete cosine transform processing unit 51 now deals with the color processed images as the original images. It is now understood that the compressing device comprises as a part of either the discrete cosine transform processing unit 51 or the high frequency component compressing unit 55 a luminance and color difference (Y/C) separator 57 depicted separately merely for convenience of illustration by a dashed-line block. In addition, it is possible to understand that the luminance and color difference separator 57 compresses the color images only into the luminance images or only to the luminance images and the red or the blue color difference images, or "compresses" the color images into all of the luminance and the red and the blue color difference images. In such an event, the discrete cosine transform processing unit 51 serves as a component discrete cosine transform processing arrangement for processing at a time the color processed images into the discrete cosine transform processed images.

A video encoder 59 encodes the quantized images or the high frequency component compressed images into video codes for storage in the random access memory 45. The video codes are herein called presubsampled video codes.

In a conventional compressing device, use is not made of high frequency component compression. It is possible in this event to understand that the combination of the discrete cosine transform processing unit 51 and the quantizer 53 produces high frequency component including images and serves merely as a supply arrangement for supplying the high frequency component including images to the video encoder 59 as input images. In the conventional compressing device, the encoder 59 encodes the input images into the video codes for use as they are as the compressed video signal.

An audio encoder 61 encodes the original audio signal into an encoded audio signal for storage in the random access memory 45. The encoded signal is used as the compressed audio signal and is represented by a sequence of presubsampled audio codes.

In compliance with the compression factors, the presubsampled video codes and the presubsampled audio codes are produced in one-to-one correspondence in pairs. The presubsampled video codes and corresponding ones of the presubsampled audio codes are synchronized with each other. A combination of each presubsampled video code and a corresponding one of the presubsampled audio codes is called a presubsampled frame.

Controlled by the central processing unit 39 and by the compression data table stored in the read-only memory 43, a frame subsampler 63 subsamples the presubsampled frames into subsampled frames in compliance with a frame rate compression factor indicated by the compression data table. Each subsampled frame comprises a subsampled video code and a subsampled audio code in the manner which will presently be described. As a result, an intermittent succession of such subsampled video codes represents the compressed video signal. A like succession of such subsampled audio codes represents the compressed audio signal.

It is possible to use the high frequency component compressing unit 55 as an image subsampler in deriving differently compressed images from the original images for use as the high frequency component compressed images. In such an event, the compression data table indicates an image compression factor.

Controlled by the central processing unit 39 and in compliance with the image compression factor, the image subsampler first compresses the picture elements of each original block into subsampled elements. In this manner, the picture elements of the succession of original blocks are reduced in number to the subsampled elements, which are rearranged into a succession of rearranged blocks, each consisting typically of eight by eight subsampled elements. The rearranged blocks are included in the digital video signal less in number than the original blocks. The image subsampler next subsamples the rearranged blocks into subsampled blocks or number compressed blocks, which are processed with the high frequency components of the original images untouched.

Figure 2:
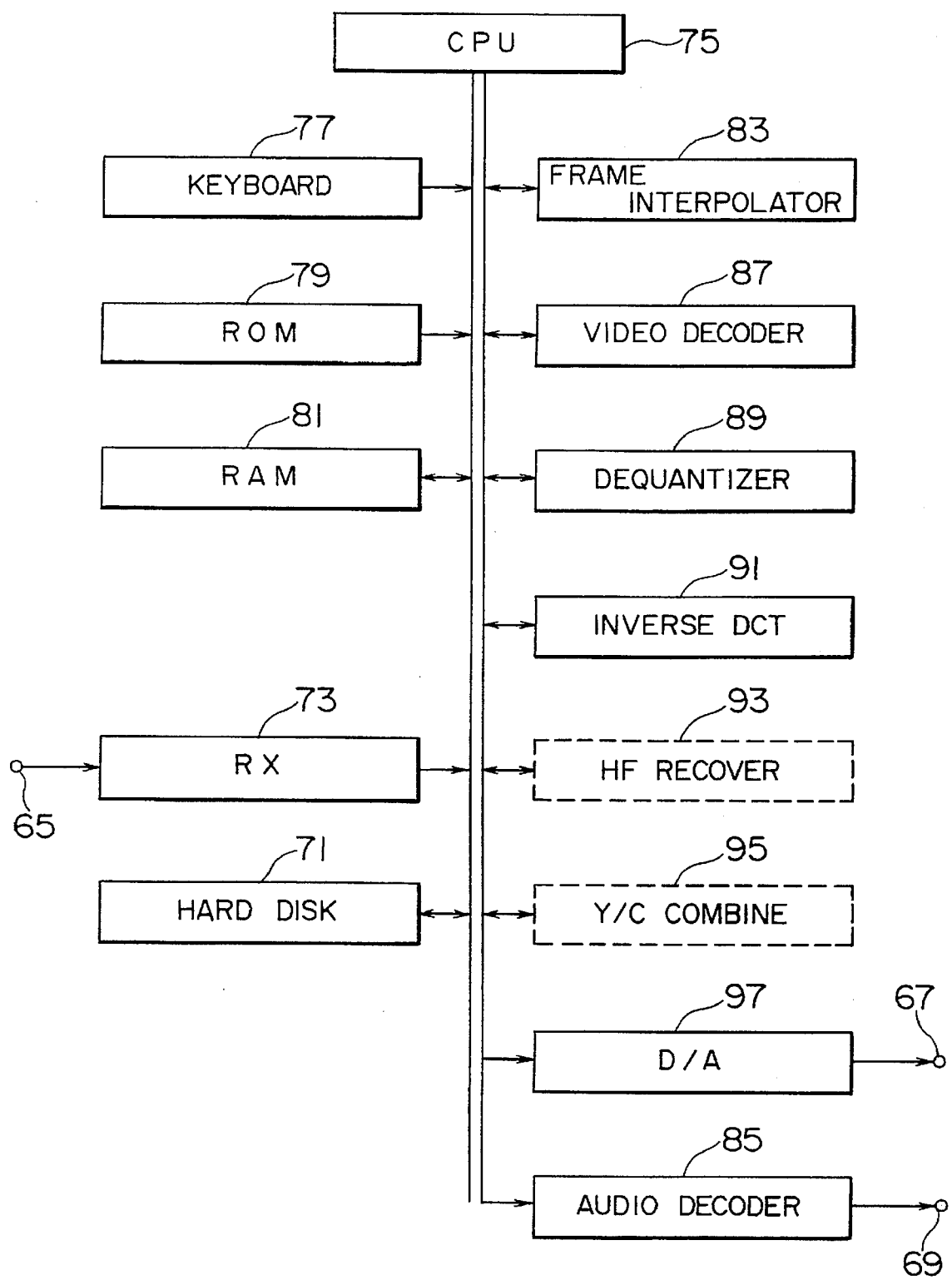
FIG. 2 is a block diagram of the expanding device mentioned in conjunction with FIG. 1.

Referring to FIG. 2, attention will now be directed to the expanding device mentioned in conjunction with FIG. 1. The expanding device has a compressed signal input terminal 65, a video signal output terminal 67, an audio signal output terminal 69, and a site for an expander hard disk 71. Through the transmission medium, the compressed video and audio signal is supplied to the compressed signal input terminal 65 and thence to a receiver unit (RX) 73. The hard disk 71 is either a fresh hard disk or the compressor hard disk 37 (FIG. 1) in which the compressed video and audio signal is stored.

The expanding device comprises an expander central processing unit 75 for controlling a video and audio expansion operation of the expanding device and an expander keyboard 77 for specifying the operation. An expander read-only memory 79 is preliminarily loaded with the compression data table mentioned before. It should be noted that the compression data table may be used differently from that used in the compressing device.

For read out and storage by the central processing unit 75, an expander random access memory 81 keeps various video and audio signals which will be described in detail in the following. Controlled by the central processing unit 75 and specified by the keyboard 77, the random access memory 81 is loaded first with the compressed video and audio signal as a stored video and audio signal either from the hard disk 71 or from the receiver unit 73. The random access memory 81 serves partially as a frame memory.

Controlled by the central processing unit 75 and by the compression data table stored in the read-only memory 79, a frame interpolator 83 interpolates additional frames in the subsampled frames in accordance with the frame rate compression factor to produce an alternating succession of reproduced video codes and reproduced audio codes which codes correspond to the presubsampled video codes and the presubsampled audio codes and are stored in the random access memory 79. The central processing unit 75 separately reads the reproduced video codes and the reproduced audio codes.

Controlled by the central processing unit 75 in this manner, an audio decoder 85 decodes the reproduced audio codes into an audio reproduction for delivery to the audio signal output terminal 69. The audio reproduction represents the original audio signal. Similarly controlled, a video decoder 87 decodes the reproduced video codes into high frequency component excluded images which correspond to the high frequency component compressed images.

Controlled by the central processing unit 75 and by the compression data table, a dequantizer 89 first recovers high frequency components of the high frequency component excluded images in accordance with the high frequency component compression factor to produce high frequency component including images. Subsequently, the dequantizer 89 dequantizes the high frequency component including images into dequantized images.

The high frequency components of the original images are not yet fully recovered in the high frequency component images and consequently in the dequantized images. With this fact in mind, an inverse discrete cosine transform processing unit 91 first recovers high frequency components of the dequantized images in accordance with the high frequency component compression factor to produce high frequency component recovered images. Thereafter, the inverse discrete cosine transform processing unit 91 subjects the high frequency component recovered images to inverse discrete cosine transform to produce a succession of reproduced images.

The reproduced images correspond to the original images, the luminance images, the red color difference images, or the blue color difference images. It should, however, be again noted that the high frequency components of such original images may not be fully recovered. At any rate, it is possible to raise the rates of operation of the dequantizer 89 and the inverse discrete cosine transform processing unit 91.

It is possible to understand that a combination of the dequantizer 89 and the inverse discrete cosine transform processing unit 91 as a high frequency component recovering arrangement for recovering the high frequency components of the high frequency component excluded images in accordance with the high frequency component compression factor to produce the high frequency component recovered images. The high frequency component recovering arrangement is depicted separately from the combination as a high frequency component recovering unit 93 by a dashed-line block.

A conventional expanding device may comprise the dequantizer 89 and the inverse discrete cosine transform processing unit 91. The dequantizer and the inverse discrete cosine transform processing unit 91 of the conventional expanding device, however, do not deal either singly or jointly with the high frequency components of the type described.

When the color video signal is dealt with, the central processing unit 75 combines the luminance images either with the color difference images of the red or the blue color difference or with the color difference images of the red and the blue color differences into combined images which correspond to the original images of the color video signal. It is consequently possible to understand that the expanding device comprises a luminance and color difference combiner 95 depicted as a dashed-line block.

The succession of the reproduced images is a digital video signal. A digital-to-analog converter (D/A) 97 converts the digital video signal to an analog video signal for delivery to the video signal output terminal 67.

Reviewing FIGS. 1 and 2, the compression factors are selected from the compression data table in dependence on the processing rate of the expanding device in the manner which will presently be described. It should furthermore be noted that some of device elements of the compressing and the expanding devices are preferably implemented by software. For example, the high frequency component compressing and recovering arrangements will shortly be described.

Referring afresh to FIG. 3 and again to FIGS. 1 and 2, a compression data table is preliminarily stored in each of the read-only memories 43 and 79 of the compressing and the expanding devices. The compression data table comprises a plurality of memory sections. In the example being illustrated, each memory section comprises first through fourth memory areas, each one byte long.

The first memory area of each memory section is for indicating a processing rate PR of a pertinent one of the compressing and the expanding devices. The processing rate is a rate or speed at which each original image or video duration is processed. In the illustrated example, such processing rates are specified by 1, 2, 3, and so forth. The processing rate of 1 indicates a rate of one original image in less than 30 milliseconds. The processing rate of 2 indicates a rate of one original image between 30 and 60 milliseconds. The processing rate of 3 indicates a rate of each original image between 60 and 90 milliseconds. The processing rate of 4 (not shown) indicates a rate of one original image between 90 and 120 milliseconds.

The second areas of the memory segments indicate high frequency component compression factors Ch for the processing rates of the respective memory sections and are specified by 1, 2, and others. The factor of 1 indicates subsampling of one to one, namely, with no omission. The factor of 2 indicates subsampling of one to two. The factor of 4 (not shown) indicates subsampling of one to four.

The third memory areas of the memory segments indicate frame rate compression factors Cf for the processing rates of the respective memory segments and are specified by 0, 1, and so forth. The rate of 0 indicates 30.0 subsampled frames per second. The factor of 1 indicates 15.0 subsampled frames per second. The factor of 2 (not shown) indicates 10.0 subsampled frames per second. The factor of 3 (not shown) indicates 7.5 subsampled frames per second. The factor of 4 (not shown) indicates 6.0 subsampled frames per second.

The fourth memory areas of the memory segments indicate color compression factors Cc for the processing rates of the respective memory segments and are specified by 7 and others for color components of each original picture element. It will be presumed as described before that the color components are indicated by the luminance Y, the red color difference Cr, and the blue color difference Cb.

The factor of 7 indicates use of the luminance, the red color difference, and the blue color difference with none omitted. The factor 5 (not shown) indicates use of only the luminance and the blue color difference. The factor of 3 (not shown) indicates use of the luminance and the blue color components. The factor of 1 (not shown) indicates use of the luminance alone, namely, treatment of a color video signal as a monochromatic video signal.

If the image subsampler is used as the high frequency component compressing unit 55 with a counterpart unit (not shown) used in the expanding device, the compression data table should include a memory area in each memory segment. These memory areas of the memory segments indicate the image compression factors for the processing rates of the respective memory segments and are specified by 1, 2, 4, and so on.

The image compression factor of 1 indicates no omission of the original picture elements or the original blocks. The factor of 2 indicates omission of every other original picture elements or original blocks in the horizontal direction. The factor of 4 indicates omission of every other original picture element or original block in each of the horizontal and the vertical directions.

In the manner which is mentioned before and will later be described in connection with the expanding device, various compression factors are selected from the compression data table. In the compressing device, such compression factors are selected so that each original image can be processed with a time interval defined by the processing rate. This makes it possible to keep synchronism between the subsampled video codes and corresponding ones of the subsampled audio codes. Likewise, synchronism is established between the video reproduction and the audio reproduction.

For example, it will be assumed in connection with the compressing device that it takes 5 milliseconds to deal with each original image. In this event, each original image must be processed within about 28 milliseconds in order to select the frame rate compression factor indicative of 30.0 subsampled frames per second. If each original image is processed within 28 milliseconds, it is unnecessary to compress the original images. If each original image is processed between 28 and 61 milliseconds, the high frequency component compression factor should indicate subsampling of one to two. Consequently, the frame rate compression factor should indicate 15.0 subsampled frames per second. If each original image is processed between 62 and 94 milliseconds, the subsampled frames should further be compressed. The frame rate compression factor of 15.0 subsampled frames per second is selected together with the high frequency component compression factor for subsampling of one to two.

In the example illustrated in FIG. 3, the compression factors are selected for the compressing device as follows. When the processing rate is slower than 30 milliseconds, the high frequency component compression factor is for subsampling of one to one with the frame rate compression factor made to indicate 30 subsampled frames per second and with the high frequency component compression factor made to indicate subsampling of one to one. For a color video signal, all of the luminance and the red and the blue color differences are processed. When the processing rate is between 30 and 60 milliseconds, the high frequency component compression factor may indicate subsampling of one to two with the frame rate compression factor selected to indicate 15.0 subsampled frames per second and with the luminance and the red and the blue color differences all processed.

Referring to FIG. 4, the compressed video and audio signal is given a format standardized in accordance with ISO 10918-1 as follows. The compressed video and audio signal is derived from a succession of frames which are herein called presubsampled frames as above. Each presubsampled frame is a sequence of a start code SOI (start of image), a compressed video code Vf, a compressed audio code Af, and an end code EOI. The start code indicates a start of each presubsampled frame and is specified by a five-digit hexadecimal number with an ending H as 0FFD8H. The compressed video and audio codes include compression parameters and will presently be described. The end code indicates an end of the presubsampled frame under consideration and is specified by another five-digit hexadecimal number 0FFD9H.

Turning to FIG. 5, the compressed video code Vf is given a format which is modified into a modified format according to an example of this invention. In the example being illustrated, the compressed video code consists of a series of an information area or block INF, a video start code SOF, and a compressed video area VCOM. The information area will shortly be described. The video start code SOF indicates a start of the compressed video area VCOM and is specified by a still another five-digit hexadecimal number 0FFC0H. The compressed video area VCOM represents the presubsampled video code and may include its compression parameter in the standardized format.

In FIG. 5, the information area INF consists of a series of an application data subarea APP, a byte length subarea Lp, reservation subareas Cp and Mp, a video compression data start subarea Tp, and a video parameter subarea PARAM. The application data subarea APP indicates a start of the information area INF and is specified by a yet another five-digit hexadecimal number 0FFE0H. The byte length subarea Lp indicates a byte length of a part of the information area INF that follows the application data subarea APP. In the illustrated example, the byte length subarea Lp indicates sixteen bytes. The compression data start subarea Tp indicates a start of the video compression data subarea and is specified by a four-digit number 0002H. The parameter subarea PARAM includes another reservation subarea RES and indicates the image compression factor Qf, the high frequency component compression factor Qh, the frame rate Ft, and the color component compression factor Co.

Further turning to FIG. 6, the compressed audio code Af is given by another modified format. The compressed audio code consists of a series of an application data area APP (same reference symbols being used in this manner), a byte length area Lp, reservation areas Cp and Mp, a video and audio compression data start area Tp, and a parameter area PARAM which is described below. The application data area APP is similar to the application data subarea and is specified by the above-used five-digit hexadecimal number 0FFE0H. The byte length area Lp indicates a byte length of a part of the compressed audio code that follows the application data area APP. In the illustrated example, the byte length area indicates at least thirty bytes. The video and audio compression data start area Tp indicates a start of the parameter area PARAM and is specified by another four-digit number 0001H.

In FIG. 6, the parameter area consists of a reservation subarea TIME, a frame number subarea Fn, a video and audio information subarea Ft (same reference symbol being used), another reservation subarea RES1, an audio length subarea Fs, a compression mode subarea M, a sampling frequency subarea Fr, a channel subarea Ch, still another reservation subarea RES2, and a compressed audio area ACOM of at least one byte. The frame number subarea Fn indicates an ordinal number given to one of the presubsampled frames that includes the compressed audio code Af being illustrated. The ordinal number is represented by one of serial numbers 0 (zero) through a seven-digit number 0FFFFFFH. The serial numbers are given serially to the presubsampled frames which are not yet subsampled into the subsampled frames. When some of the presubsampled frames are omitted or skipped as omitted frames, the ordinal number does not include the serial number or numbers given to such omitted frame or frames. It may be mentioned here that each byte of the subareas consists of a zeroth (least significant) bit through a fifteenth (most significant) bit.

When the compressed video code Vf indicates the frame rate Ft in its parameter subarea PARAM, the video and audio information subarea Ft indicates only a link datum by the fourteenth and the fifteenth bits and need not indicate the frame rate, which is indicated by the zeroth through the tenth bits. The link datum specifies by "01" that one presubsampled audio code alone follows, by "10" that one compressed video code alone precedes, and by "11" that both the subsampled video and audio code are linked. The audio length subarea Fs indicates by one of two-digit numbers 00H through FFH (corresponding to decimal 1 through 256) a byte length of the compressed audio area. The byte length of one byte is default. The compression mode subarea M indicates a compression mode, such as the adaptive differential pulse code modulation (ADPCM) by a two-digit number 00H, of the presubsampled audio code. The sampling frequency subarea Fr indicates a sampling frequency of the original audio signal. The sampling frequency is 8.27 kHz (default), 11.03 kHz, 16.54 kHz, and 22.05 kHz when the sampling frequency subarea indicates two-digit numbers 05H, 04H, 03H, and 02H. The channel subarea Ch indicates by 00H a left monaural channel, by 01H a right monaural channel, and by 02H a two-channel stereo channel (default). The compressed audio code represents the presubsampled audio code.

Figure 7:
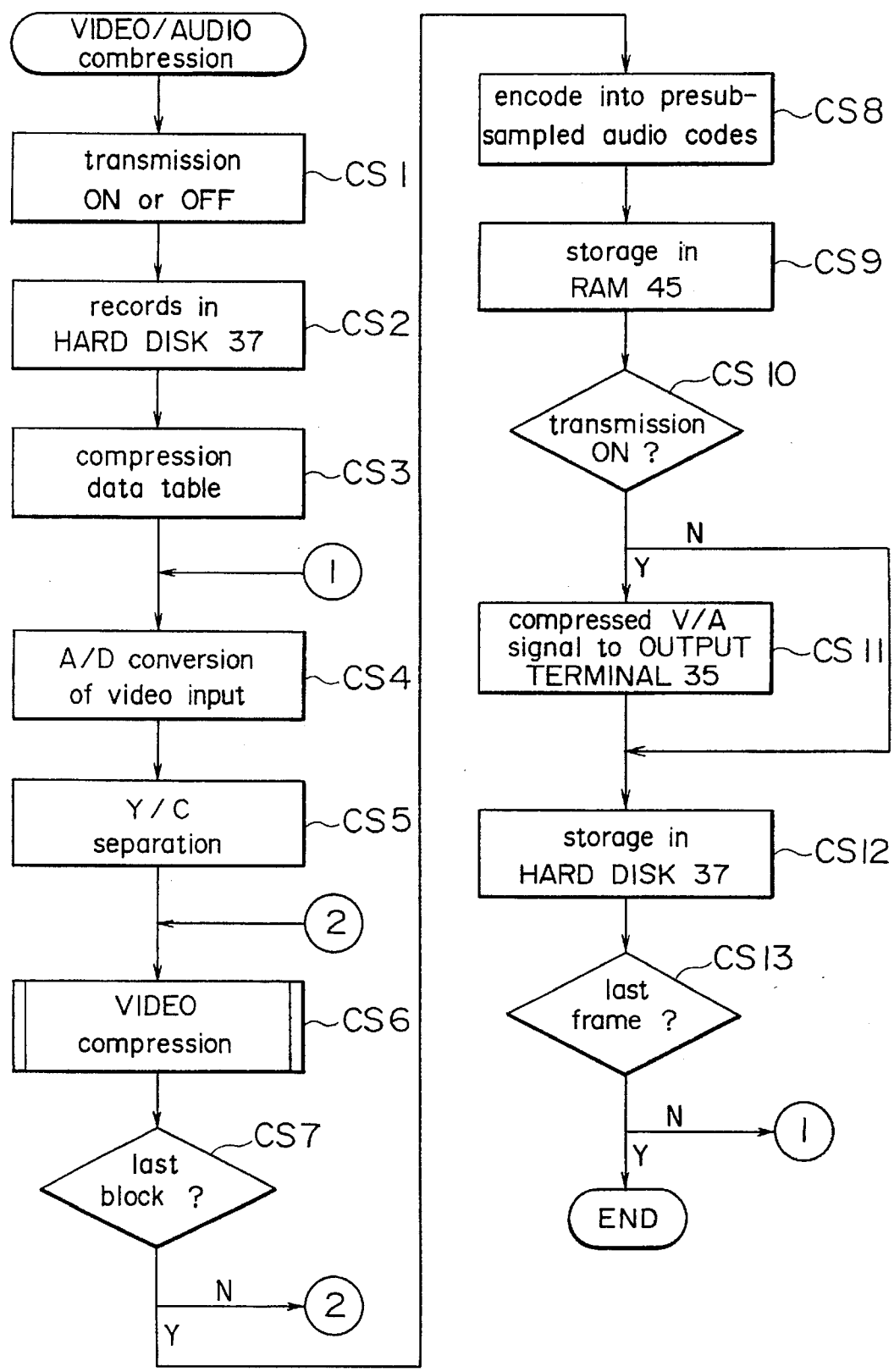
FIG. 7 shows a flow chart for use in describing operation of the compressing device illustrated in FIG. 1.

Referring now to FIG. 7 with FIG. 1 additionally referred to, the compressing device is operable in a video and audio compression mode as follows. It will be presumed that the compressing device is supplied with an analog color video signal and an original audio signal which are synchronized with each other.

At a first compression step CS1, the compressor keyboard 41 is manipulated to indicate transmission on or off. When the transmission on is indicated, a compressed video and audio signal is sent through the transmitter unit 47 to the compressed signal output terminal 35. When the transmission is off, the compressed video and audio signal is stored in the compressor hard disk 37.

At a second compression step CS2, the keyboard 41 is handled to indicate the number of compressed frames and a file name in which the compressed frames should be stored in the hard disk 37. At a third compression step CS3, the compressor central processing unit 39 reads the compression data table from the compressor read-only memory 43.

Meanwhile, the analog color video signal is converted at a fourth compression step CS4 to a digital color video signal. At a fifth compression step CS5, the digital color video signal is separated by the luminance and color difference separator 51 into a luminance signal and a color difference signal. These signals are stored in the compressor random access memory 45 as the above-mentioned original images.

At a sixth compression step CS6, the original images are subjected to a video compression step in the manner which will presently be described. A little more in detail, the central processing unit 39 successively reads the original images from the random access memory 45 and makes the forward discrete cosine transform processing unit 51 produce the forward discrete cosine transform processed images, the quantizer 53 produces the quantized images, and the video encoder 59 produces the presubsampled video codes. It should be understood that a succession of the discrete cosine transform processed images includes one of the images at its end as a last block. A succession of the quantized images includes one of the images at its end as a last block. Each of such successions comprises parts which are encoded into a presubsampled video code and is referred to as a block. A compressed video and audio signal includes one of the subsampled frames at its end as a last frame.

At a seventh compression step CS7, the central processing unit 39 judges whether or not the presubsampled video codes are processed eventually to the last block. If the last block is not yet processed, the sixth compression step is repeated.

Meanwhile, the original audio signal is encoded by the audio encoder 61 into the presubsampled audio codes for storage in the random access memory 45 as indicated at an eighth compression step CS8. The central processing unit 39 now puts the frame subsampler 63 at a ninth compression step CS9 into operation of producing the subsampled frames for storage in the random access memory 45.

At a tenth compression step CS10, the central processing unit 39 checks the keyboard 41 to judge whether or not the transmission is on. If the transmission is on, the central processing unit 39 makes at an eleventh compression step CS11 the transmitter unit 47 send the compressed video and audio signal from the random access memory 45. Either at the same time or if the transmission is not on, namely, off, the central processing unit 39 stores at a twelfth compression step CS12 the compressed video and audio signal in the hard disk 37.

If the central processing unit 39 finds at a thirteenth compression step CS13 that a last frame is already processed, operation in the video and audio compression mode comes to an end. Otherwise, the fourth compression step and the following compression steps are repeated until the central processing unit 39 finds at the thirteenth compression step that the last block has been dealt with.

Reviewing FIGS. 3 through 6, the frame rate compression factor Ft of the compressed video and audio signal is used in the expanding device as it stands. The high frequency component compression factor Qh and the color component compression factor Co of the compressed video and audio signal are herein called indicated high frequency component compression factor and an indicated color component compression factor. For use in the expanding device, one of the color component compression factors Cc of the compression data table is selected in compliance with the indicated color component compression factor Co in the manner described in the following. Similarly, one of the high frequency component compression factor Ch of the compression data table is selected in compliance with the indicated high frequency compression factor Qh.

Figure 8:
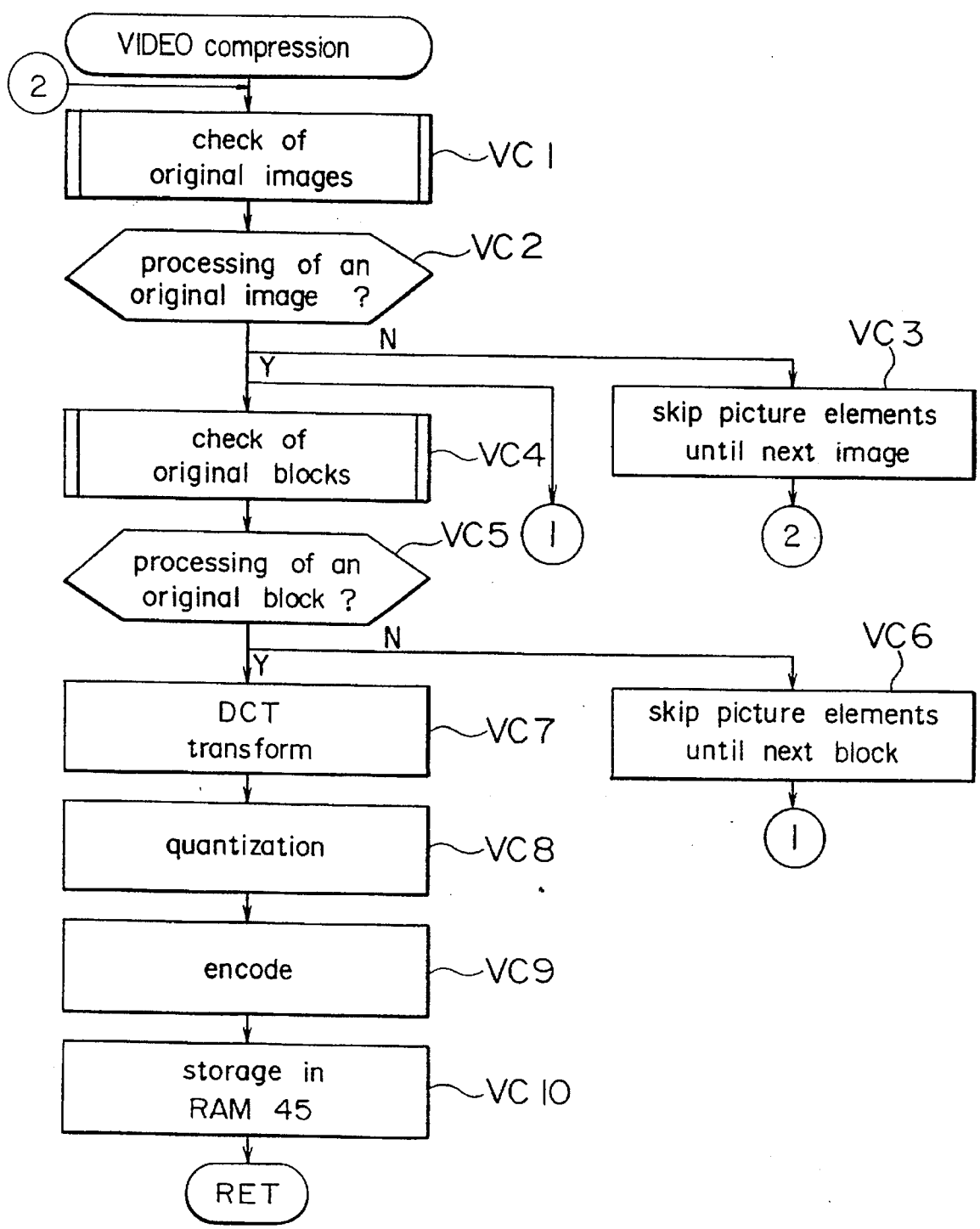
FIG. 8 shows a flow chart for use in describing in detail a part of the flow chart depicted in FIG. 7.

Turning to FIG. 8 with FIGS. 1, 3, and 5 referred to in addition, the description will proceed to a video compression step carried out at the sixth compression step CS6 described in connection with FIG. 7. In the manner described in the foregoing, the central processing unit 39 successively reads the original images or video durations of a selected one of the luminance and the color difference signals from the random access memory 45. It will be assumed that the luminance signal is dealt with. The color difference signal is likewise processed.

At a first video compression step VC1, the central processing unit 39 checks each original image in the manner which will later be described. At a second video compression step VC2, the central processing unit 39 judges whether the original image under consideration should be retained as one of retained images for use in the presubsampled video codes or omitted or skipped as an omitted image. If the original image in question should be omitted, the central processing unit 49 does not check at a third video compression step VC3 the picture elements of the omitted image. Subsequently, the first video compression step VC1 is repeated to check a next following original image.

If the original image under consideration should be retained as the retained image, the central processing unit 39 successively checks at a fourth video compression step VC4 the original blocks of the retained image. At a fifth video compression step VC5, the central processing unit judges whether each original block should be retained as a retained block or omitted or skipped as an omitted block. If the original block in question should be skipped, the central processing unit 39 does not check at a sixth video compression step VC6 the picture elements of the omitted block and returns to the fourth video compression step.

If the original block under consideration should be retained, the central processing unit 39 deals with the retained block. More particularly, such retained blocks are compressed at a seventh video compression step VC7 into the number compressed images, and the number compressed images are subjected to the forward discrete cosine transform by the discrete cosine transform processing unit 55. The forward quantizer 57 quantizes at an eighth video compression step VC8 such a discrete cosine transform processed signal into the quantized video signal. The video encoder 59 encodes the quantized signal at a ninth video compression step VC9 into the presubsampled video codes for storage in the random access memory 45 at a tenth video compression step VC10. The video compression operation comes to an end.

Figure 9:
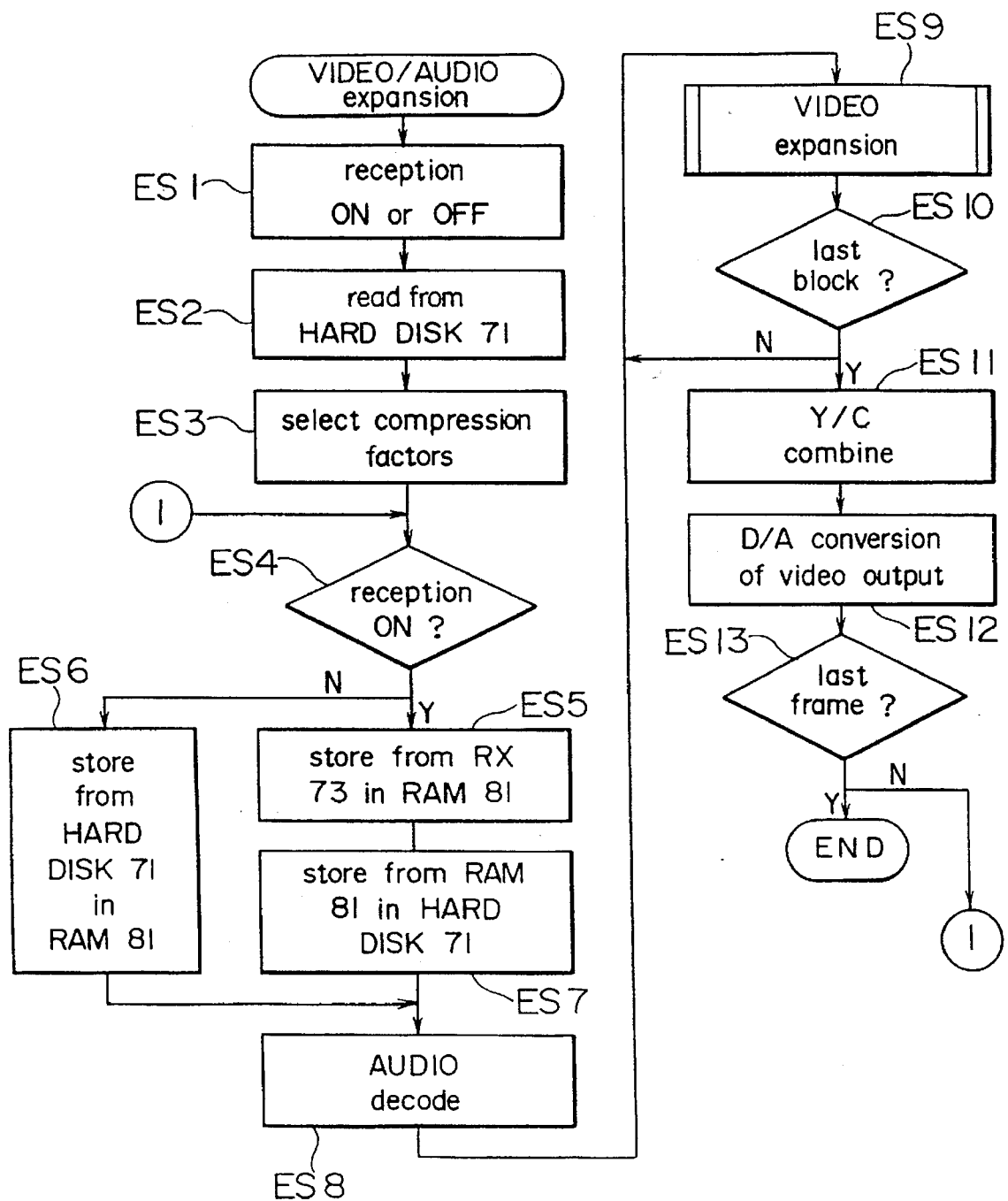
FIG. 9 shows a flow chart for use in describing operation of the expanding device illustrated in FIG. 2.

Referring to FIG. 9 with FIG. 2 additionally referred to, the expanding device is operable in a video and audio expanding mode as follows. It will be presumed either that the compressed signal input terminal 65 is supplied from the above-described compressing device with the compressed video and audio signal or that the expander hard disk 71 is the compressor hard disk 37 (FIG. 1) in which the compressed video and audio signal is stored.

At a first expansion step ES1, the expander keyboard 77 is manipulated to indicate reception on or off. The reception on is indicated when the receiver unit 73 should be used. It is possible in this event to use the fresh hard disk as the expander hard disk 71. When the reception is off, the compressed video and audio signal of the hard disk 71 is expanded.

At a second expansion step ES2, the keyboard 77 is handled to indicate the number of compressed frames of the compressed video and audio signal and a file name from which the compressed frames should be read from the hard disk 71. The expander central processing unit 75 reads at a third expansion step ES3 the compression data table from the expander read-only memory 79 and judges at a fourth expansion step ES4 whether or not the keyboard 77 indicates the reception on.

If the reception is on, the central processing unit 75 stores at a fifth expansion step ES5 the compressed video and audio signal in the expander random access memory 81 as a received video and audio signal from the receiver unit 73. If the reception is not on, namely, off, the compressed video and audio signal is stored at a sixth expansion step ES6 in the random access memory 81 as the received video and audio signal from the hard disk 71. If desired, the compressed video and audio signal is furthermore stored at a seventh expansion step ES7 in the fresh hard disk which is used as the hard disk 71. It will be presumed that the compressed video signal of the compressed video and audio signal is derived from a luminance signal.

The central processing unit 75 reads the subsampled video codes and the subsampled audio codes of the compressed video and audio signal separately from the received video and audio signal. The frame interpolator 83 produces the reproduced video codes and the reproduced audio codes. Controlled in this manner by the central processing unit 75, the audio decoder 85 decodes at an eighth expansion step ES8 the reproduced audio codes into an audio reproduction for delivery to the audio signal output terminal 69.

At a ninth expansion step ES9, the reproduced video codes are decoded by using the video decoder 87, the dequantizer 89, and the inverse discrete cosine transform processing unit 91, and the image interpolator 93. This step will shortly be described more in detail.

At a tenth expansion step ES10, the control processing unit 75 judges whether or not the presubsampled video codes are expanded up to one of the presubsampled video codes that is included in the compressed video signal at its end as a last block. If the last block is not yet dealt with, the ninth expansion step is repeated.

If the last block is already processed, the compressed video signal of the luminance signal is expanded into a luminance reproduction. The compressed video signal of the color difference signal is similarly processed into a color difference reproduction.

At an eleventh expansion step ES11, the central processing unit 75 makes the luminance and the color difference signal combiner 95 combine the luminance reproduction and the color difference reproduction into a digital signal reproduction. If the compressed video signal is derived from a monochromatic video signal, it should be understood that the tenth expansion step directly provides the digital signal reproduction.

At a twelfth expansion step ES12, the digital-to-analog converter 97 converts the digital signal reproduction into a video reproduction which is synchronized with the audio reproduction. The video reproduction is delivered to the video output terminal 67.

If the central processing unit 75 finds at a thirteenth expansion step ES13 that the last frame is already processed, operation in the video and audio expanding mode comes to an end. Otherwise, the fourth through the thirteenth expansion steps are repeated.

Figure 10:
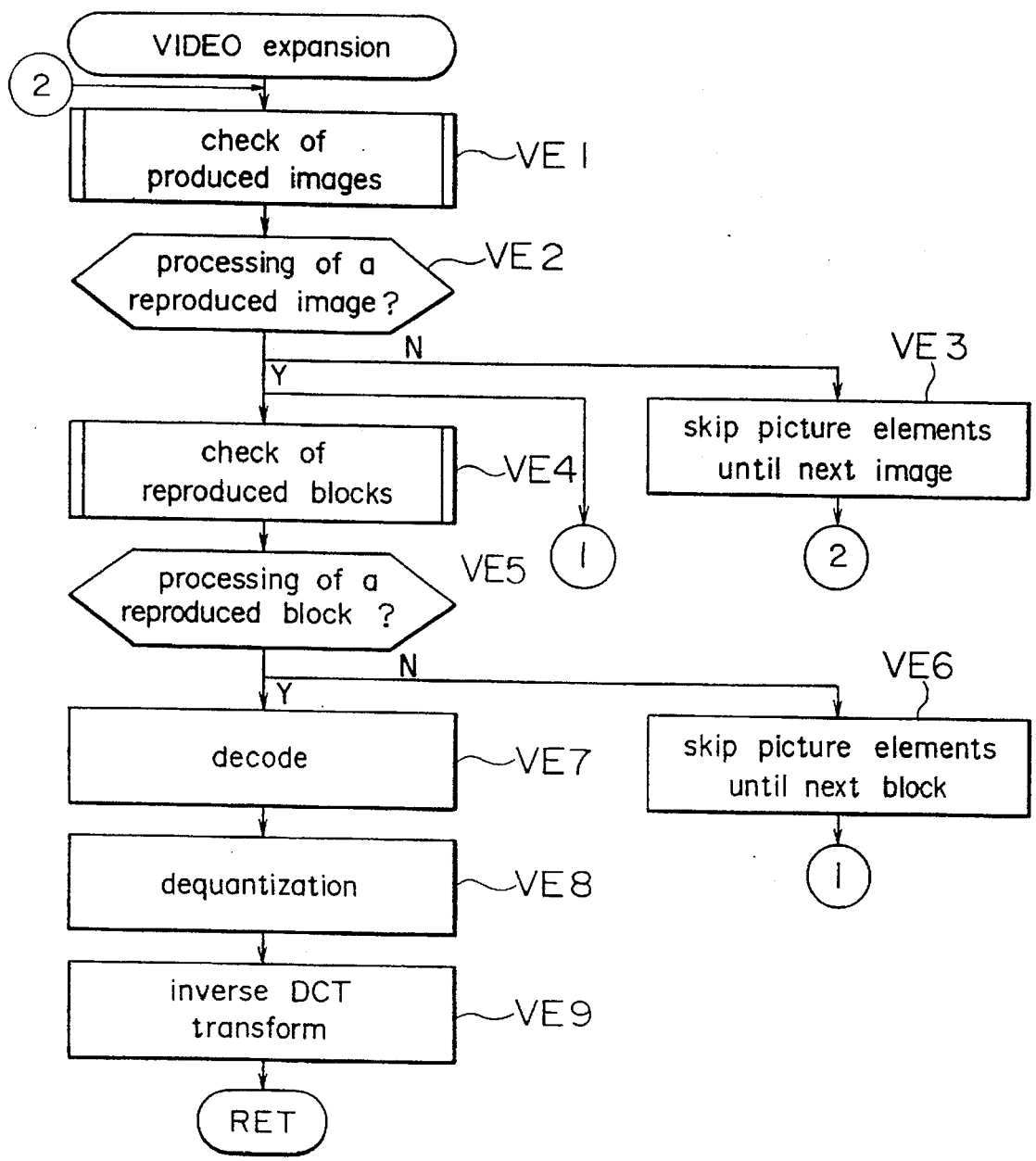
FIG. 10 shows a flow chart for use in describing in detail a part of the flow chart depicted in FIG. 9.

Turning to FIG. 10 with FIGS. 2, 3, and 5 referred to in addition, the description will proceed to a video expansion operation carried out at the ninth expansion step ES9 described in connection with FIG. 9. In the manner described in the foregoing, the central processing unit 75 successively supplies the video decoder 87 with the reproduced video codes which correspond to the presubsampled video codes in the presubsampled frames.

At a first video expansion step VE1, the central processing unit 75 checks whether or not the reproduced images of each presubsampled frame should be dealt with. At a second video expansion step VE2, the central processing unit 75 judges whether or not the presubsampled frame under consideration includes one of the video blocks that should be processed. If the presubsampled frame in question does not, the central processing unit 75 does not check at a third video expansion step VE3, this presubsampled frame but repeatedly carries out the first video expansion step VE1.

If this presubsampled frame should be retained as a retained frame, the central processing unit 75 checks at a fourth video expansion step VE4 each reproduced block. At a fifth video expansion step VE5, the central processing unit 75 judges whether or not each reproduced block should be expanded. If the reproduced block under consideration need not be expanded, this reproduced block is skipped at a sixth video expansion step VE6. The sixth expansion step returns to the fourth expansion step.

If the reproduced block in question should be retained as a retained image for expansion, the central processing unit 75 deals with the retained image. More specifically, such retained images are decoded at a seventh expansion step VE7 by the video decoder 87 into the high frequency component excluded images.

The dequantizer 89 first converts the high frequency component excluded images into dequantizer input images with reference to the high frequency component compression factor. Subsequently, the dequantizer 89 dequantizes at an eighth video expansion step VE8 the dequantizer input images into the dequantized images.

When compared with the original images used in the compressing device, each dequantized image does not fully include the high frequency components. In other words, some of the high frequency components are excluded as excluded or omitted high frequency components.

Consequently, the inverse discrete cosine transform processing unit 91 first adds some or all of the excluded high frequency components to produce processor input images. Thereafter, the inverse discrete cosine transform processing unit 91 subjects the processor input images to the inverse cosine transform to produce processor output images at a ninth video expansion step VE9.

In this manner, the high frequency component recovering arrangement recovers the high frequency components of the high frequency excluded images with reference to the high frequency compression factor to produce the processor output images as the high frequency component recovered images. It should be known that the high frequency components need not be entirely recovered. This raises the need of expansion by the high frequency recovering arrangement. The ninth video expansion step returns to the first video expansion step so long as a presubsampled frame remains unprocessed in the compressed video signal of the received video and audio signal.

Figure 11:
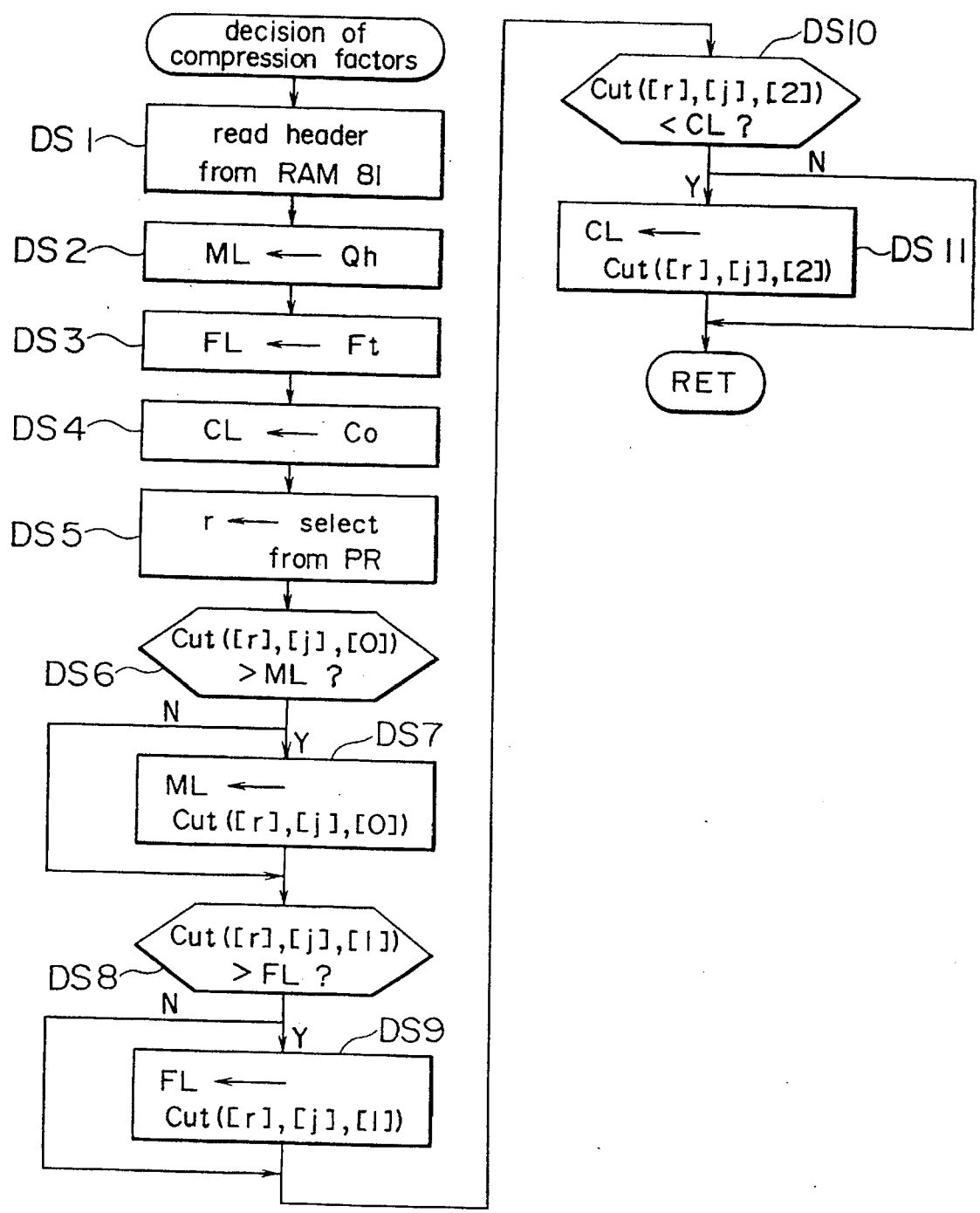
FIG. 11 shows a flow chart for use in describing extraction of various compression factors from the compression data table exemplified in FIG. 3 for use in the expanding device illustrated in FIG. 2.

Referring to FIG. 11 with FIGS. 2, 3, and 5 continuously referred to, various compression factors are decided on carrying out the video expansion operation illustrated with reference to FIG. 10 and like operations by extraction from the compression data table of the expander read-only memory 79 as follows. In FIG. 11, various variables are used on the expander random access memory 81.

A variable r represents the processing rate described in conjunction with FIG. 3. Another variable Cut([5], [2], [3]) is called a cut variable and represents the high frequency component compression factor Ch, the frame rate Cf, and the color compression factor Cc of the compression data table. The cut variable depends on first through third arguments [5], [2], and [3]. The first argument represents the processing rate of the compression data table. The second argument represents an index j of the compression data table and is not herein used. The third arguments indicates by a decimal number various steps of decision of the compression factors.

At a first decision step DS1, the expander central processing unit 75 reads from the received video and audio signal of the random access memory 81 a header or, more particularly, the parameter subarea PARAM included in the information area INF of the compressed video code which is the subsampled video code. At a second decision step DS2, the high frequency component compression factor Qh of the header is stored as a variable ML. At a third decision step DS3, the frame rate Ft of the header is stored as another variable FL. At a fourth decision step DS4, the color component compression factor Co of the header is stored as still another variable CL.

At a fifth decision step DS5, the processing rate PR is selected as a selected rate by the program and is stored as the variable r. At a sixth decision step DS6, the central processing unit 75 judges whether or not a zeroth cut variable Cut([r], [j], [0]) exceeds the variable ML. If the zeroth cut variable is greater, the zeroth cut variable is stored at a seventh decision step DS7 afresh as the variable ML.

At an eighth decision step DS8, the central processing unit 75 judges whether or not a first cut variable Cut([r], [j], [1]) is greater than the variable FL. If the first cut variable is greater, the first cut variable is stored at a ninth decision step DS9 afresh as the variable F1. If the zeroth cut variable does not exceed at the sixth decision step, the eighth decision step is immediately carried out with the zeroth cut variable changed to the first cut variable.

At a tenth decision step DS10, the central processing unit 75 judges whether or not a second cut variable Cut([r], [j], [2]) is less than the variable CL. If the second cut variable is smaller, the second cut variable is stored at an eleventh decision step DS11 anew as the variable CL. If the second cut variable is not smaller at the eighth decision step, the tenth decision step is carried out at once with the first cut variable changed to the second cut variable.

When the second cut variable is stored as the variable CL at the eleventh decision step, the extraction of the compression factors from the compression data table of the read-only memory 79 comes to an end. The compression factors are given by the variables ML, FL, and CL.

Figure 12:
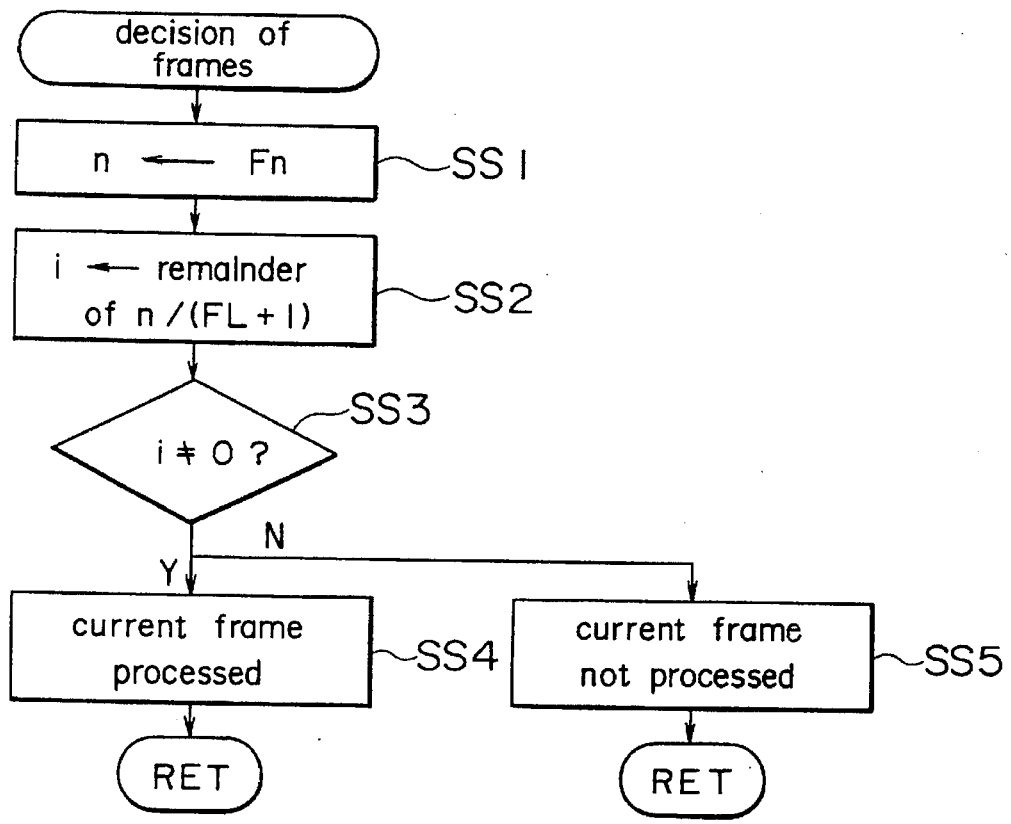
FIG. 12 shows a flow chart for use in describing in detail a part of the flow chart depicted in FIG. 10.

Referring to FIG. 12 with FIGS. 2, 6, and 11 additionally referred to, the description will proceed to decision of frames, namely, to the first video expansion step VE1 described in connection with FIG. 10. In FIG. 12, a variable n represents the ordinal number given in the frame number subarea Fn of the parameter area of the compressed audio code Af which is used to primarily represent the subsampled audio code in the received video and audio signal. Another variable i will become clear as the description proceeds.

In the manner described with reference to FIG. 10, the subsampled frames of the received video and audio signal are successively dealt with. It will be assumed that one of the subsampled frames is currently processed as a current frame. Still another variable FL is decided at the ninth decision step DS9.

At a first substep SS1, the ordinal number of the current frame is stored from the expander random access memory 81 as the variable n. In preparation for a second substep SS2, the central processing unit 75 divides the variable n by a sum of one and the variable FL to calculate a remainder. At the second substep, the remainder is stored as the variable i.

At a third substep SS3, the central processing unit judges whether or not the variable i is equal to zero. If the variable i is not equal to zero, the current frame is decided at a fourth substep SS4 to be processed. If the variable is equal to zero, the current frame is decided at a fifth substep SS5 not to be processed. Each of the fourth and the fifth substeps returns to the first substep for a next following frame.

Figure 13:
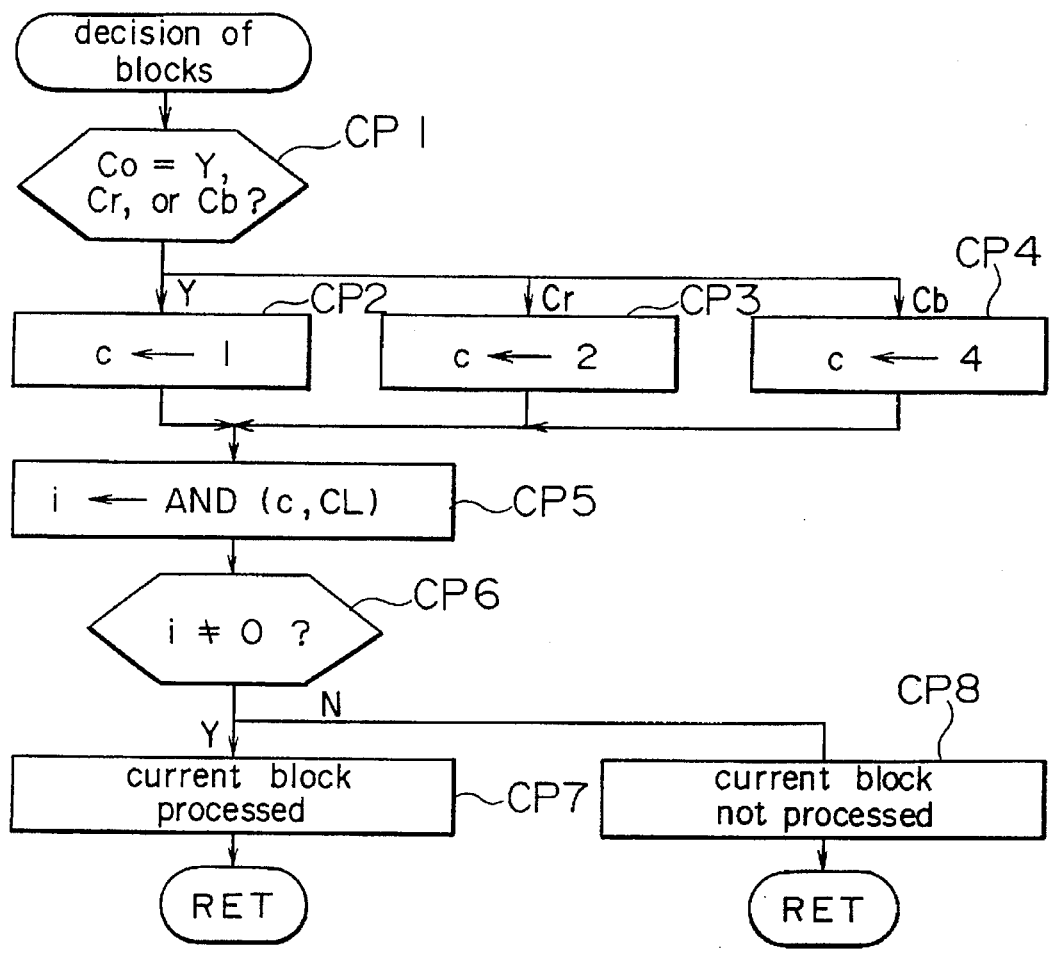
FIG. 13 shows a flow chart for use in describing in detail a different part of the flow chart depicted in FIG. 10.

Referring afresh to FIG. 13 and again to FIG. 2 and other figures, the description will proceed to decision of the blocks, namely, the fourth video expansion step VE4 described in conjunction with FIG. 10. In FIG. 13, this step is applied, when the video compression step is referred to, to color components of the picture elements of each original image. In such an event, the step will be called a color processing operation and is implemented by software which may be called a color processing arrangement.

In the video expanding operation, each presubsampled frame is a succession of presubsampled blocks which correspond to the original images and consist of compressed elements of various color components. The presubsampled blocks are successively dealt with. While one of these blocks is checked, this one will be called a current block.

At a first color processing step CP1, the expander central processing unit 75 judges whether the color component of each element of the current block is given the luminance Y, the red color difference Cr, or the blue color difference Cb. Variables c and i are used in the manner described above.

At a second color processing step CP2, the variable c is given the decimal number 1 if the color component is the luminance. At a third color processing step CP3, the decimal number 2 is given to the variable c if the color component is the red color difference. At a fourth color processing step CP4, the decimal number 4 is allotted to the variable c if the color component is the blue color difference.

At a fifth color processing step CP5, the central processing unit 75 stores as the variable i an AND of the variable c and the variable CL decided during the decision illustrated with reference to FIG. 11 as regards the color component compression factor. At a sixth color processing step CP6, the central processing unit 75 judges whether or not the variable i is equal to zero.

If the variable i is not equal to zero, it is determined at a seventh color processing step CP7 that the current block should be processed. If the variable i is equal to zero, it is decided at an eighth color processing step CP8 that the current block need not be processed. In either event, the first color processing step and the following steps are repeated in connection with a next subsequent block.

Figure 14:
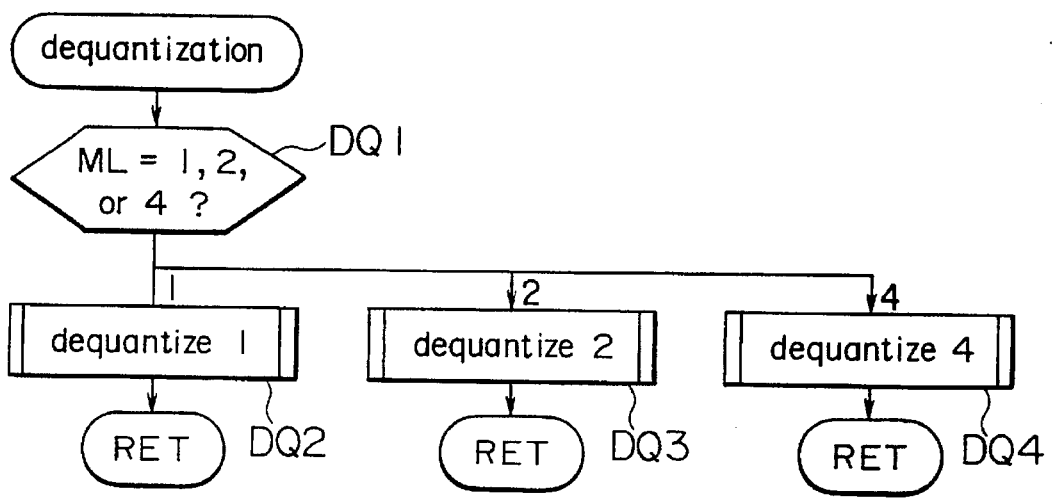
FIG. 14 shows a flow chart for use in describing in detail a further different part of the flow chart illustrated in FIG. 10.

Referring now to FIG. 14 with FIG. 2 and others additionally referred to, the dequantizer 89 is operable as follows in a dequantization processing operation described as the eighth video expansion step VE8 in conjunction with FIG. 10. In FIG. 14, a variable ML represents the high frequency component compression factor which is successively decided during the decision illustrated with reference to FIG. 11 with regard to the high frequency component compression factor. It will now be assumed that each original image consists of a full number of high frequency components.

At a first dequantization step DQ1, the expander central processing unit 75 judges whether the variable ML is given the value 1, 2, or 4, according to which values the high frequency components are recovered on processing dequantization.

At a second dequantization step DQ2, the high frequency component compression factor is found to have the value 1. In this event, the dequantizer 89 recovers the high frequency components to the full number. If the high frequency component compression factor has the value 2 at a third dequantization step DQ3, the dequantizer 89 recovers the high frequency components to a half of the full number. If the high frequency component compression factor is given the value 4 at a fourth dequantization step DQ4, the dequantizer 89 recovers the high frequency components to a quarter of the full number. The first and one of the second through the fourth dequantization steps are repeated in connection with a next following block.

Figure 15:
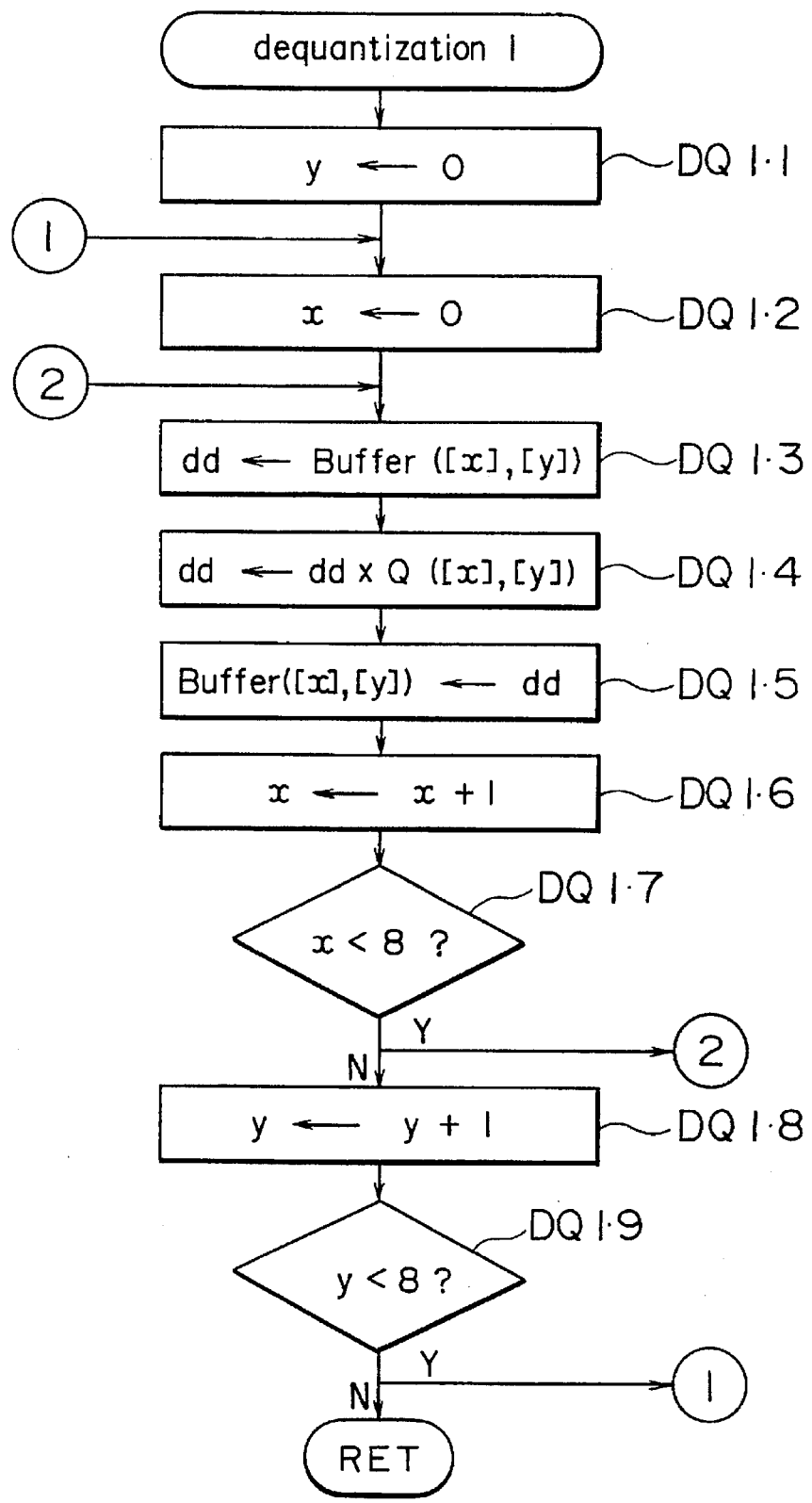
FIG. 15 shows a flow chart for use in describing in detail one of a plurality of steps of the flow chart depicted in FIG. 14.

Turning to FIG. 15 with FIGS. 2, 14, and others additionally referred to, attention will be directed to the second dequantization step DQ2 described in connection with FIG. 14. Variables x, y, and dd, a buffer Buffer([x], [y]), and a factor Q([x], [y]) are used in the manner described in the following. The buffer is for use in dequantization. Each of the arguments x and y of the buffer represents elements of each block and is variable between 0 and 7, both inclusive.

At a first dequantization substep DQ1.1, zero is used as the variable y. At a second dequantization substep DQ1.2, zero is used also as the variable x. At a third dequantization substep DQ1.3, the variable dd is given a value of the buffer. At a fourth dequantization substep DQ1.4, the buffer is multiplied in the variable dd by the factor Q to provide a product variable.

At a fifth dequantization substep DQ1.5, the product variable is stored in the buffer. At a sixth dequantization substep DQ1.6, one is added to the variable x to provide a sum x variable.

At a seventh dequantization substep DQ1.7, the expander central processing unit 75 judges whether or not the sum x variable is less than eight. If the sum x variable is less than eight, the third and the following dequantization substeps are repeated. If the sum x variable is not less than eight, one is added at an eighth dequantization substep DQ1.8 to the variable y to provide a sum y variable. At a ninth dequantization substep DQ1.9, the sum y variable is compared with eight. If the sum y variable is less than eight, the second and the subsequent dequantization substeps are repeated. If the sum y variable is not less than eight, the second dequantization step comes to an end.

Figure 16:
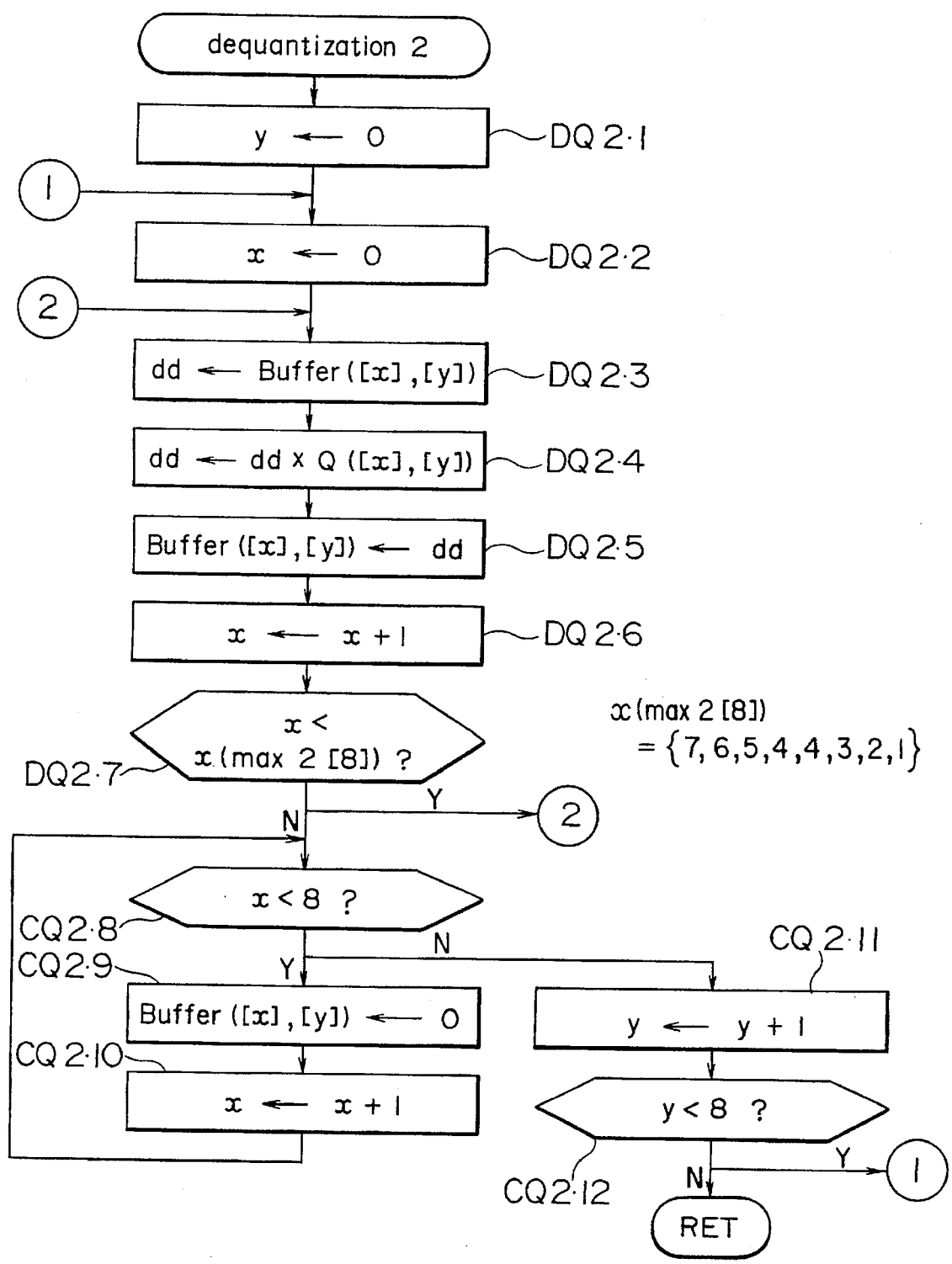
FIG. 16 shows another flow chart for use in describing the step depicted in FIG. 15.

Turning further to FIG. 16, the third dequantization step DQ3 will be described in detail. The variables, the buffer, and the factor Q are used like in the foregoing.

At a first dequantization substep DQ2.1, zero is used as the variable y. At a second dequantization substep DQ2.2, zero is used also as the variable x. At a third dequantization substep DQ2.3, the variable dd is assigned with a value of the buffer. At a fourth dequantization substep DQ2.4, the buffer is multiplied in the variable dd by the factor Q to provide a product variable.

At a fifth dequantization substep DQ2.5, the product variable is stored in the buffer. At a sixth dequantization substep DQ2.6, one is added to the variable x to provide a sum x variable.

At a seventh dequantization substep DQ2.7, the central processing unit 75 judges whether or not the sum x variable is less than its maximum value x(max2[8]). If the sum x variable is less than the maximum value, the third dequantization substep and the following dequantization substeps are repeated. If the sum x variable is not less than the maximum value, the sum x variable is compared at an eighth dequantization substep DQ2.8 with eight.

If the sum x variable is less than eight, zero is stored at a ninth dequantization substep DQ2.9 in the buffer. Subsequently, one is again added to the sum x variable at a tenth dequantization substep DQ2.10 to provide a twice added variable. By using the twice added variable, the eighth dequantization substep is repeated.

If either the sum x variable or the twice added variable is not less than eight at the eighth dequantization substep, one is added at an eleventh dequantization substep DQ2.11 to the variable y to provide a sum y variable. The sum y variable is compared at a twelfth dequantization substep DQ2.12 with eight. If the sum y variable is less than eight, the twelfth dequantization substep returns to the second and the following dequantization substeps. If the sum y variable is not less than eight, the third dequantization step comes to an end.

Still further turning to FIG. 17, the fourth dequantization step DQ4 will be described in detail. The variables, the buffer, and the factor Q are used as before.

At a first dequantization substep DQ3.1, zero is used as the variable y. At a second dequantization substep DQ3.2, zero is used also as the variable x. At a third dequantization substep DQ3.3, the variable dd is assigned with a value of the buffer. At a fourth dequantization substep DQ3.4, the buffer is multiplied in the variable dd by the factor Q to provide a product variable, which is stored afresh as the variable dd.

At a fifth dequantization substep DQ3.5, the product variable is stored in the buffer. At a sixth dequantization substep DQ3.6, one is added to the variable x to provide a sum x variable.

At a seventh dequantization substep DQ3.7, the central processing unit 75 judges whether or not the sum x variable is less than its maximum value x(max4[8]). If the sum x variable is less than the maximum value, the third and the following dequantization substeps are repeated.

If the sum x variable is not less than the maximum value, it is judged at an eighth dequantization substep DQ3.8 whether or not the sum x variable is less than eight. If the sum x variable is less than eight, zero is used at a ninth dequantization substep DQ3.9 as the buffer. At a tenth dequantization substep DQ3.10, one is added to the variable x to provide a twice added variable. Using the twice added variable, the eighth dequantization substep is repeated.

If either the sum x variable or the twice added variable is not less than eight at the eighth dequantization substep, one is added to the variable at an eleventh dequantization substep DQ3.11 to provide a sum y variable. At a twelfth dequantization substep DQ3.12, the sum y variable is compared with eight. If the sum y variable is less than eight, the second and the subsequent dequantization substeps are repeated. If the sum y variable is not less than eight, the fourth dequantization step comes to an end.

Figure 17:
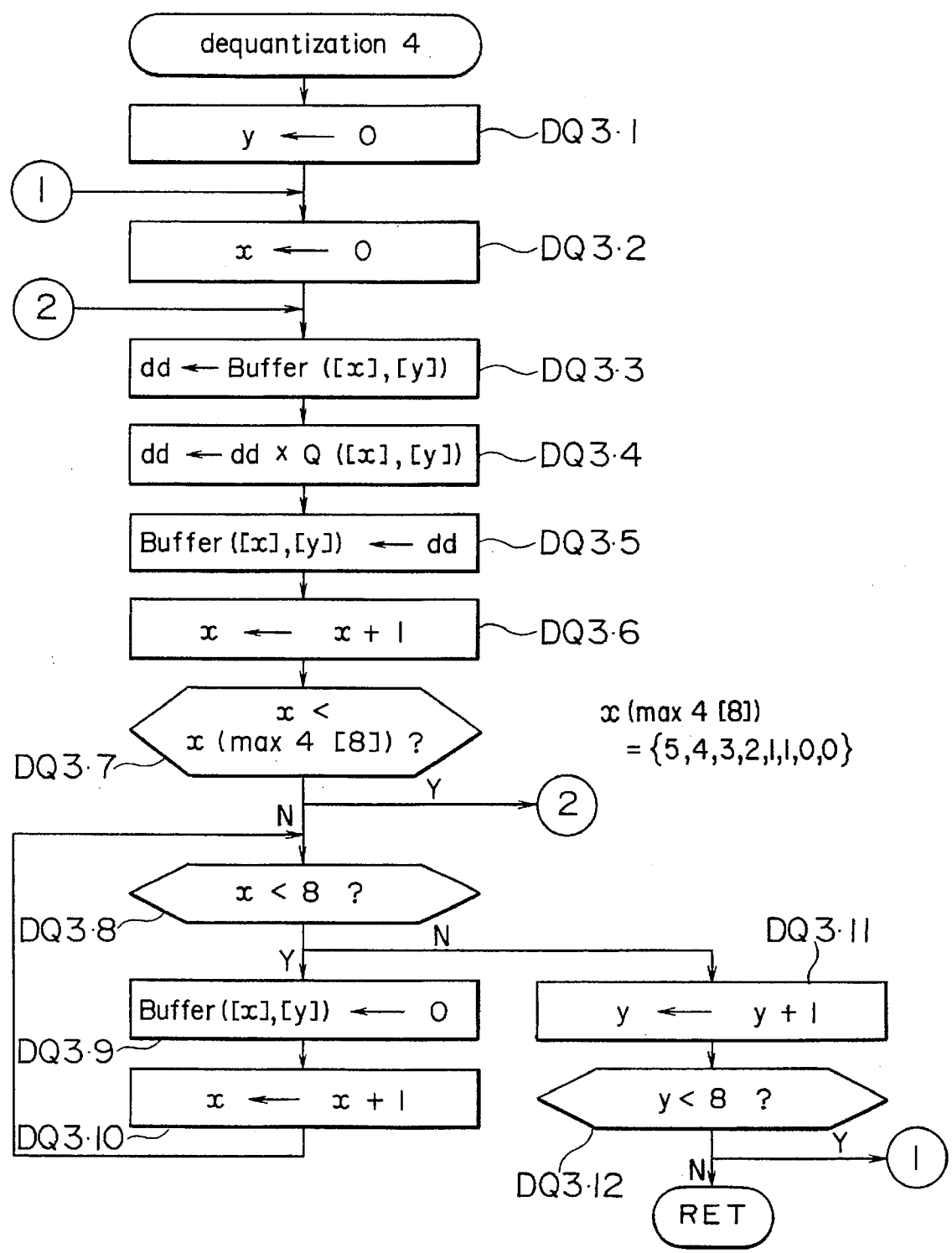
FIG. 17 shows still another flow chart for use in describing the step depicted in FIG. 15.

Reviewing FIGS. 15 through 17, the maximum value x(max2[8]) is used when the high frequency compression factor is one to two. The maximum value x(max4[8]) is used when the high frequency component compression factor is one to four. In FIG. 15, all calculation is repeated sixty-four times without omission. In FIG. 16, the maximum value is used to repeat the calculation thirty-two times, namely, a sum of 7, 6, 5, 4, 4, 3, 2, and 1, with the maximum value used to omit some of the calculation. In FIG. 17, the maximum value is used to repeat the calculation sixteen times, namely, a sum of 5, 4, 3, 2, 1, 1, 0, and 0.

Figure 18:
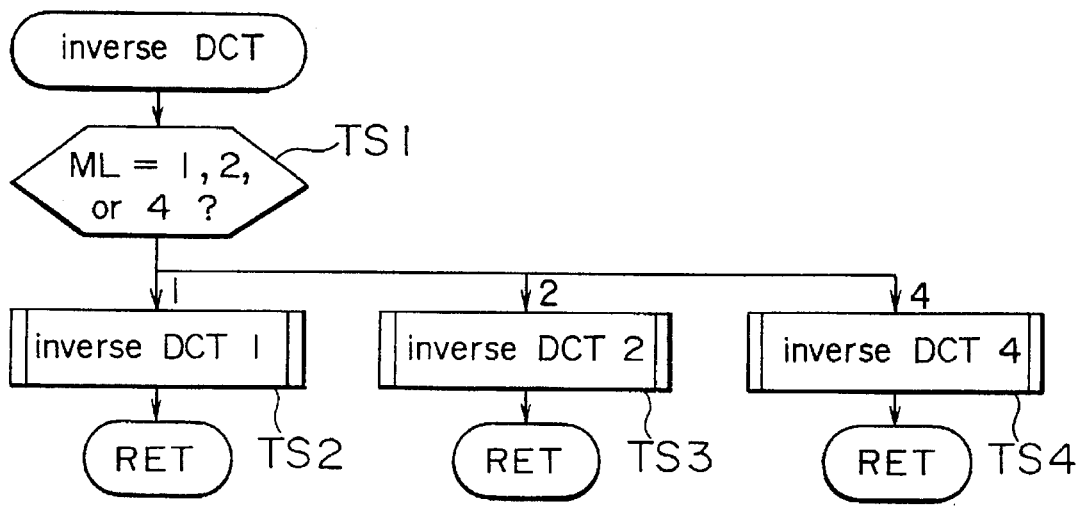
FIG. 18 shows a flow chart for use in describing in detail a still further different part of the flow chart depicted in FIG. 10.

Referring to FIG. 18 with FIG. 2 and others additionally referred to, the inverse discrete cosine transform processing unit 91 is operable as follows in the ninth video expanding step VE9 described in connection with FIG. 10. The variable ML is used as in FIG. 14. It will be again assumed that each original image consists of a full number of high frequency components.

At a first transform processing step TS1, the expander central processing unit 75 judges whether the variable ML indicates the value 1, 2, or 4, according to which value the high frequency components are recovered on processing the inverse discrete cosine transform.

At a second transform processing step TS2, the high frequency component compression factor is found to have the value 1. In this event, the inverse discrete cosine transform processing unit 91 recovers the high frequency components to the full number. If the high frequency component compression factor has the value 2 at a third transform processing step ST3, the inverse discrete cosine transform unit 91 recovers the high frequency components to a half of the full number. If the high frequency component compression factor is given the value 4 at a fourth transform processing step ST4, the inverse discrete cosine transform processing unit 91 recovers the high frequency components to a quarter of the full number. The first and one of the second through the fourth transform processing steps are repeated with regard to the next subsequent block.

Turning to FIGS. 19(a) and (b) with FIG. 2 and others additionally referred to, attention will be directed to the second transform processing step TS2 described in connection with FIG. 18. The variables x, y, and dd and the buffer are used as in FIGS. 15 through 17. The buffer is now for use in processing the inverse discrete cosine transform. Additional variables u and v and a region variable t([v], [u]) are used. The region variable indicates a region in which the variables are variable. A coefficient Coeff ([v], [u]) is used. Depending on the circumstances, the region variable, the buffer, and the coefficient are indicated by t([v], [y]) or t([y], [u]), Buffer ([y], [u]), and Coeff ([v], [y]) or Coeff([x], [u]).

At a first transform substep TS1.1, zero is given to the variable y. At a second transform substep TS1.2, zero is given also to the variable v. At a third transform substep TS1.3, zero is furthermore given to the variable dd. At a fourth transform substep TS1.4, zero is additionally used as the variable u. At a fifth transform substep TS1.5, the variable dd is changed to a sum of the variable dd and a product of the buffer Buffer ([y], [u]) and the coefficient Coeff([v], [u]).

At a sixth transform substep TS1.6, one is added to the variable u to provide a sum u variable. At a seventh transform substep TS1.7, the sum u variable is compared with eight. If the sum u variable is less than eight, the seventh transform substep returns to the fifth transform substep. If the sum u variable is not less than eight, the variable dd is stored at an eighth transform substep TS1.8 in the region variable t([v], [y]).

At a ninth transform substep TS1.9, one is added to the variable v to provide a sum v variable. At a tenth transform substep TS1.10, the sum v variable is compared with eight. If the sum v variable is less than eight, the tenth transform substep returns to the third transform substep. If the sum v variable is not less than eight, one is added at an eleventh transform substep TS1.11 to the variable y to provide a sum y variable.

At a twelfth transform substep TS1.12, the sum y variable is compared with eight. If the sum y variable is less than eight, the second transform substep is repeated. If the sum y variable is not less than eight, zero is used at a thirteenth transform substep TS1.13 as the variable y. At a fourteenth transform substep TS1.14, zero is used also as the variable x. At a fifteenth transform substep TS1.15, zero is additionally used as the variable dd. At a sixteenth transform substep TS1.16, zero is furthermore used as the variable u. At a seventeenth transform substep TS1.17, the variable dd is changed to a sum of the variable dd and a product of the region variable t([y], [u]) and the coefficient Coeff([x], [u]).

At an eighteenth transform substep TS1.18, one is added to the variable u to provide a sum u variable. At a nineteenth transform substep TS1.19, the sum u variable is compared with eight. If the sum u variable is less than eight, the seventeenth transform substep is repeated.

If the sum u variable is not less than eight, the variable dd is stored in the buffer Buffer ([x], [y]) at a twentieth transform substep TS1.20. At a twenty-first transform substep TS1.21, one is added to the variable x to provide a sum x variable. At a twenty-second transform substep TS1.22, the sum x variable is compared with eight. If the sum x variable is less than eight, the fifteenth transform substep is repeated. If the sum x variable is not less than eight, one is added to the variable y at a twenty-third transform substep TS1.23 to provide a sum y variable.

At a twenty-fourth transform substep TS1.24, the sum y variable is compared with eight. If the sum y variable is less than eight, the fourteenth transform substep is repeated. If the sum y variable is not less than eight, the second transform step comes to an end.

Further turning to FIGS. 20(a) and (b) with FIG. 2 and others additionally referred to, attention will be directed to the third transform processing step TS3 described in connection with FIG. 18.

At a first transform substep TS2.1, zero is used as the variable y. At a second transform substep TS2.2, zero is also used as the variable v. At a third transform substep TS2.3, zero is used additionally as the variable dd. At a fourth transform substep TS2.4, zero is used furthermore as the variable u. At a fifth transform substep TS2.5, the variable dd is changed to a sum of the variable dd and a product of the buffer Buffer ([y], [u]) and the coefficient Coeff([v], [u]).

At a sixth transform substep TS2.6, one is added to the variable u to provide a sum u variable. At a seventh transform substep TS2.7, the sum u variable is compared with its maximum value u(max2[y]). If the sum u variable is less than the maximum value, the fifth transform substep is repeated. If the sum u variable is not less than the maximum value, the variable dd is stored at an eighth transform substep TS2.8 in the region variable t([v], [y]).

At a ninth transform substep TS2.9, one is added to the variable v to provide a sum v variable. At a tenth transform substep TS2.10, the sum v variable is compared with eight. If the sum v variable is less than eight, the third transform substep is repeated. If the sum v variable is not less than eight, one is added at an eleventh transform substep TS2.11 to the variable y to provide a sum y variable.

At a twelfth transform substep TS2.12, the sum y variable is compared with eight. If the sum y variable is less than eight, the second transform substep is repeated. If the sum y variable is not less than eight, zero is used as the variable y at a thirteenth transform substep TS2.13. At a fourteenth transform substep TS2.14, zero is used also as the variable x. At a fifteenth transform substep TS2.15, zero is additionally used as the variable dd. At a sixteenth transform substep TS2.16, zero is used furthermore as the variable u. At a seventeenth transform substep TS2.17, the variable dd is changed to a sum of the variable dd and a product of the region variable t([y], [u]) and the coefficient Coeff([x], [u]).

At an eighteenth transform substep TS2.18, one is added to the variable u to provide a sum u variable. At a nineteenth transform substep TS2.19, the sum u variable is compared with eight. If the sum u variable is less than eight, the seventeenth transform substep is repeated.

If the sum u variable is not less than eight, the variable dd is stored in the buffer Buffer([x], [y]) and also in the buffer Buffer([x+1], [y]) at a twentieth transform substep TS2.20. At a twenty-first transform substep TS2.21, two is added to the variable x to provide a sum x variable. At a twenty-second transform substep TS2.22, the sum x variable is compared with eight. If the sum x variable is less than eight, the fifteenth transform substep is repeated. If the sum x variable is not less than eight, one is added at a twenty-third transform substep TS2.23 to the variable y to provide a sum y variable.

At a twenty-fourth transform substep TS2.24, the sum y variable is compared with eight. If the sum y variable is less than eight, the fourteenth transform substep is repeated. If the sum y variable is not less than eight, the third transform processing step comes to an end.

Still further turning to FIGS. 21(a) and (b) with FIG. 2 and others additionally referred to, attention will be directed to the fourth transform processing step TS4 described with reference to FIG. 18.

At a first transform substep TS3.1, zero is used as the variable y. At a second transform substep TS3.2, zero is used also as the variable v. At a third transform substep TS3.3, zero is used additionally as the variable dd. At a fourth transform substep TS3.4, zero is used furthermore as the variable u. At a fifth transform substep TS3.5, the variable dd is changed to a sum of the variable dd and a product of the buffer Buffer([y], [u]) and the coefficient Coeff([v], [u]).

At a sixth transform substep TS3.6, one is added to the variable u to provide a sum u variable. At a seventh transform substep TS3.7, the sum u variable is compared with its maximum value u(max4[y]). If the sum u variable is less than the maximum value, the fifth transform substep is repeated. If the sum u variable is not less than the maximum value, the variable dd is stored in the region variable t([v], [y]) at an eighth transform substep TS3.8.

At a ninth transform substep TS3.9, one is added to the variable v to provide a sum v variable. At a tenth transform substep TS3.10, the sum v variable is compared with eight. If the sum v variable is less than eight, the third transform substep is repeated. If the sum v variable is not less than eight, one is added at an eleventh transform substep TS3.11 to the variable y to provide a sum y variable.

At a twelfth transform substep TS3.12, the sum y variable is compared with eight. If the sum y variable is less than eight, the second transform substep is repeated. If the sum y variable is not less than eight, zero is used as the variable y at a thirteenth transform substep TS3.13. At a fourteenth transform substep TS3.14, zero is used also as the variable x. At a fifteenth transform substep TS3.15, zero is additionally used as the variable dd. At a sixteenth transform substep TS3.16, zero is used furthermore as the variable u. At a seventeenth transform substep TS3.17, the variable dd is changed to a sum of the variable dd and a product of the region variable t([y], [u]) and the coefficient Coeff([x], [u]).

At an eighteenth transform substep TS3.18, one is added to the variable u to provide a sum u variable. At a nineteenth transform substep TS3.19, the sum u variable is compared with eight. If the sum u variable is less than eight, the seventeenth transform substep is repeated.

If the sum u variable is not less than eight, the variable dd is stored in the buffers, four in number, Buffer([x], [y]), Buffer([x+1], [y]), Buffer([x], [y+1]), and Buffer([x+1], [y+1]) at a twentieth transform substep TS3.20. At a twenty-first transform substep TS3.21, two is added to the variable x to provide a sum x variable. At a twenty-second transform substep TS3.22, the sum x variable is compared with eight. If the sum x variable is less than eight, the fifteenth transform substep is repeated. If the sum x variable is not less than eight, two is added at a twenty-third transform substep TS3.23 to the variable y to provide a sum y variable.

At a twenty-fourth transform substep TS3.24, the sum y variable is compared with eight. If the sum y variable is less than eight, the fourteenth transform substep is repeated. If the sum y variable is not less than eight, the fourth transform processing step comes to an end.

Figure 19:
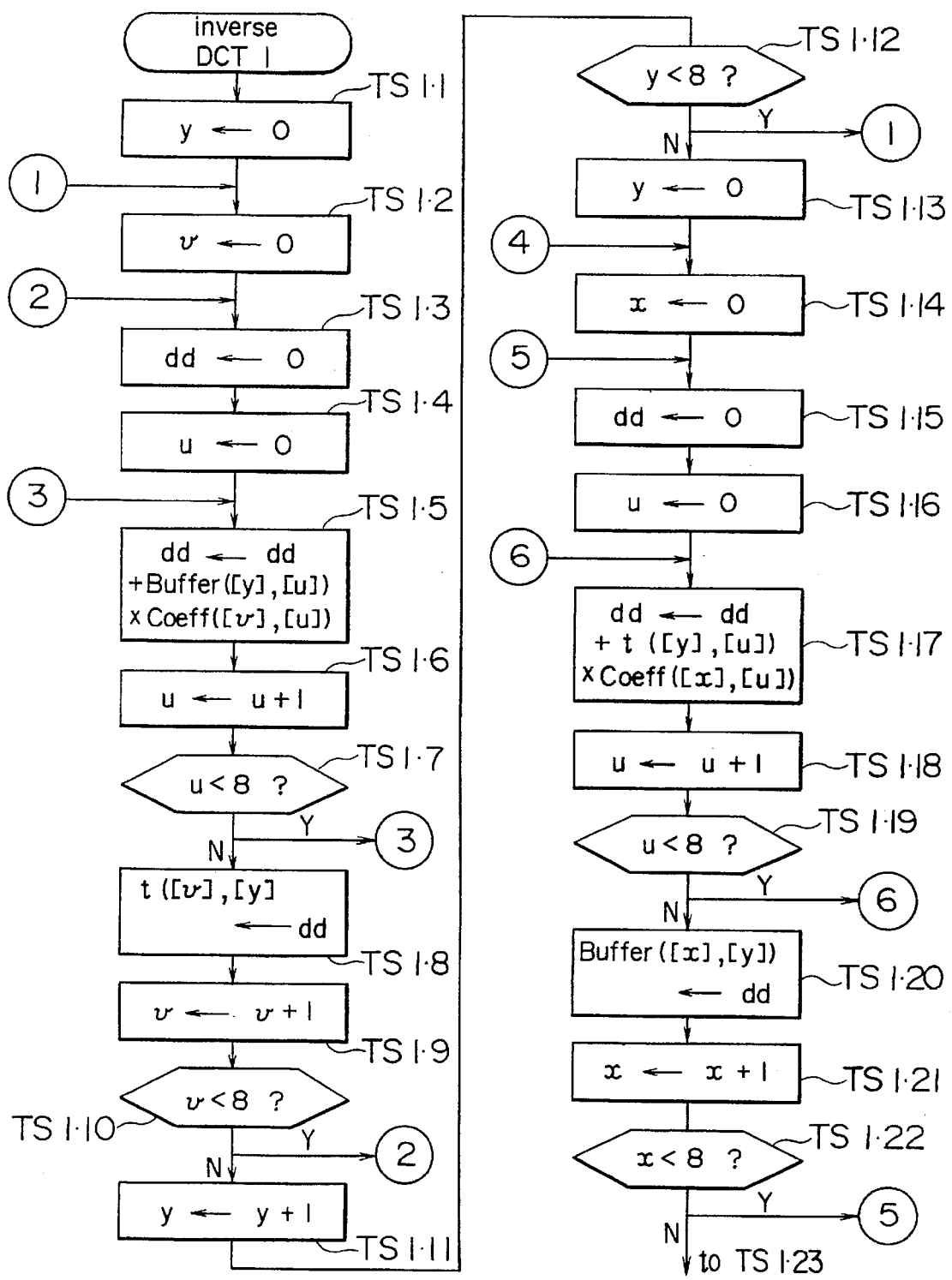
FIGS. 19(a) and (b) show a flow chart for use in describing in detail one of a plurality of steps of the flow chart depicted in FIG. 18.
Figures 19B, 20A:
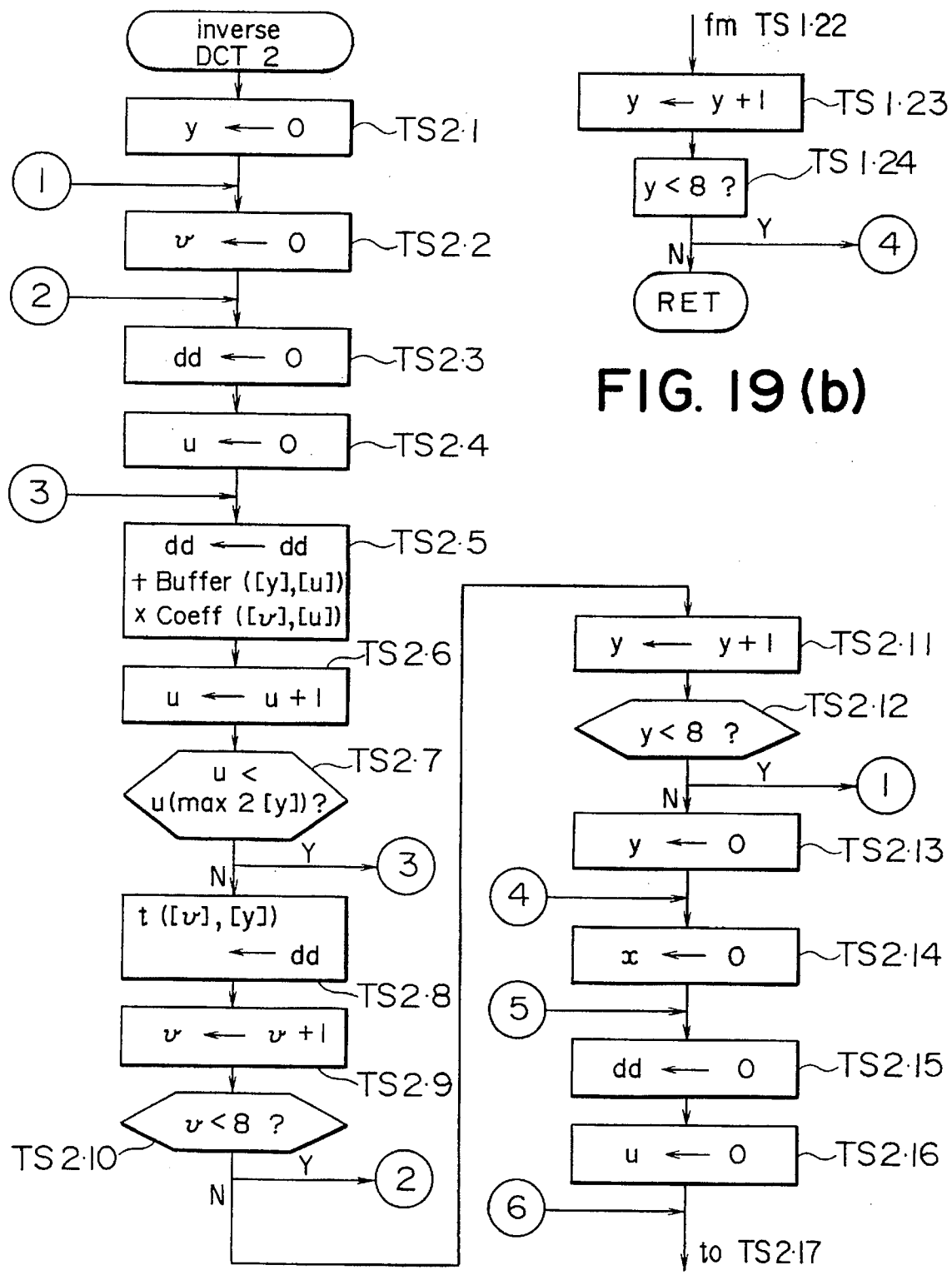
FIGS. 20(a) and (b) show another flow chart for use in describing the step depicted in FIG. 19.
Figure 20:
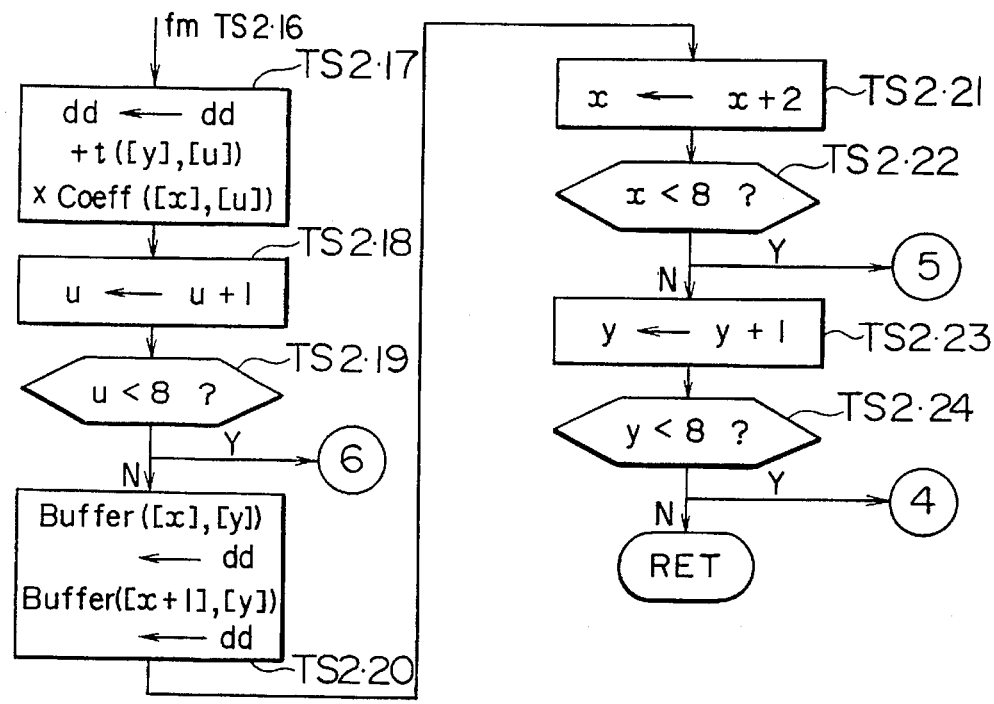
Figure 21:
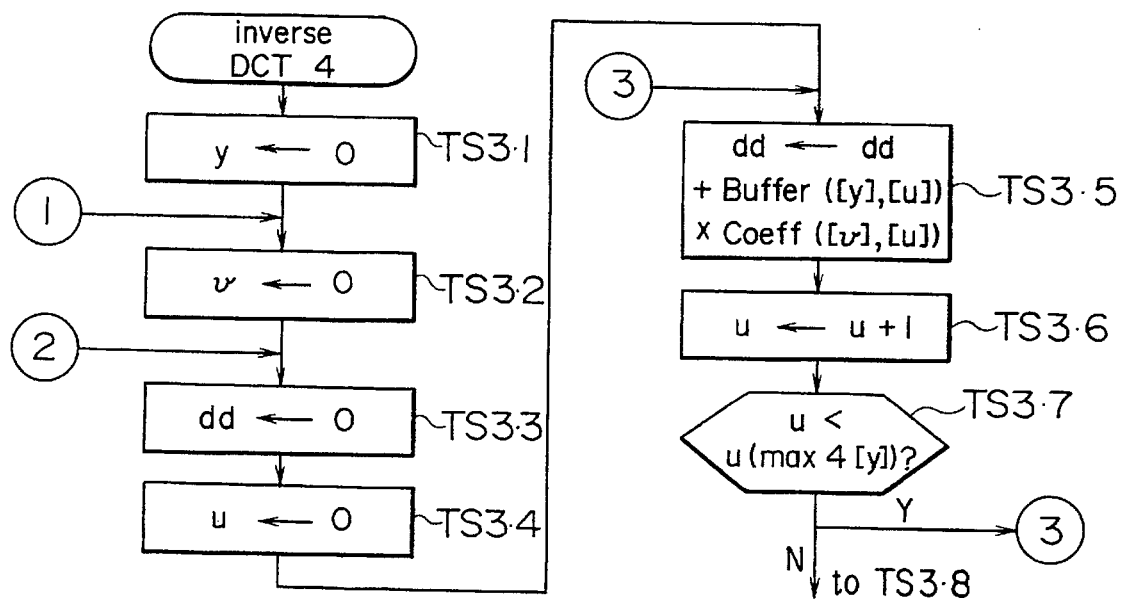
FIGS. 21(a) and (b) show still another flow chart for use in describing the step depicted in FIG. 19.
Figure 21:
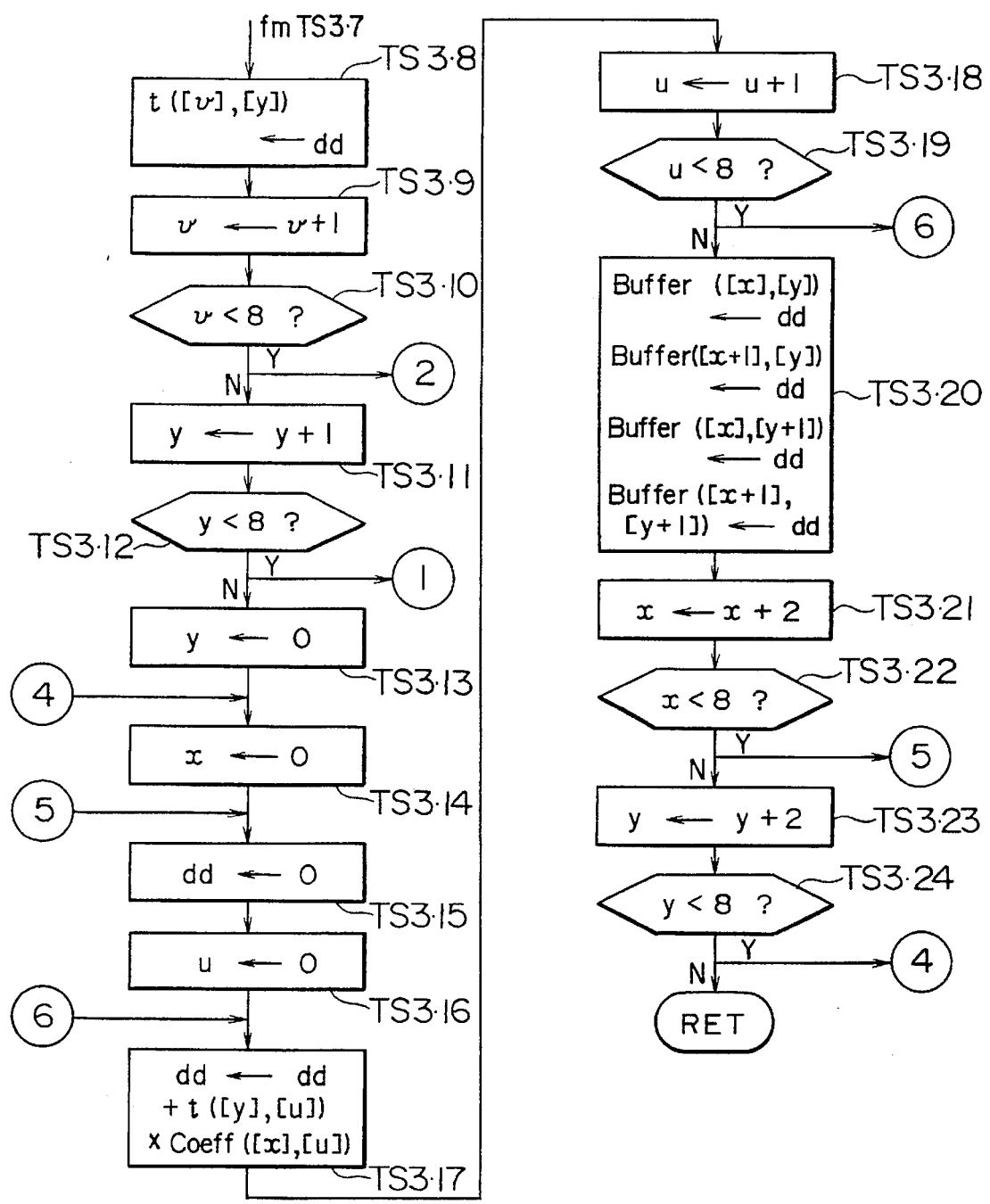

Reviewing FIGS. 19 through 21, calculation for the inverse discrete cosine transform is carried out 8×8×8×2 times, namely, 1024 times when the high frequency component compression factor indicates compression of one to one. When the high frequency component compression factor indicates one to two, calculation is carried out 8×(7+6+5+4+4+3+2+1)+8×8×4 times, namely, 512 times. When the high frequency component compression factor indicates one to four, the calculation is completed in 8×(5+4+3+2+1+1)+8×4×4 times, namely, 256 times.

In FIGS. 10 through 21, selection of the color component compression factor, the frame interpolator 83, the dequantizer 89, the inverse discrete cosine transform processing unit 91, and the high frequency component recovering unit 93 are implemented by software. It is possible to implement by software the selection of various compression factors, the frame subsampler 63, the forward discrete cosine transform processing unit 51, the quantizer 53, and the high frequency component compressing unit 55 in a manner which is similar and is simpler in some respects.

What is claimed is:

1. A video and audio signal compressing and expanding system, comprising:

a compression data table which indicates a high frequency component compression factor and a frame rate compression factor;

compression means for compressing an original video signal and an original audio signal synchronized with each other collectively into a compressed video and audio signal in compliance with said compression data table; and expansion means for expanding said compressed video and audio signal in accordance with said compression data table separately into a video reproduction and an audio reproduction which represent said original video signal and said original audio signal such that said video reproduction and said audio reproduction are synchronized, wherein said high frequency component compression factor is selected by said compression means to ensure that one of said original audio signal and said original video signal is compressed within a predetermined period of time or selected by said expansion means to ensure that one of said compressed video signal and said compressed audio signal is expanded within said predetermined period of time.

2. A video and audio signal compressing and expanding system as claimed in claim 1, wherein said high frequency component compression factor is used to ensure that said original video signal is compressed within said predetermined period of time, and wherein said predetermined period of time is used to synchronize said compressed audio signal with said compressed video signal.

3. A video and audio signal compressing and expanding system as claimed in claim 2, wherein said frame rate compression factor is also used to ensure that said original video signal is compressed within said predetermined period of time.

4. A video and audio signal compressing and expanding system as claimed in claim 3, wherein said high frequency component compression factor and said frame rate compression factor are also used to ensure that said compressed video signal is expanded within said predetermined period of time.

5. A video and audio signal compressing and expanding system as claimed in claim 1, wherein said high frequency component compression factor is used to ensure that said compressed video signal is expanded within said predetermined period of time, and wherein said predetermined period of time is used to synchronize said audio reproduction with said video reproduction.

6. A video and audio signal compressing and expanding system as claimed in claim 5, wherein said frame rate compression factor is also used to ensure that said compressed video signal is expanded within said predetermined period of time.

7. A video and audio signal compressing and expanding system as claimed in claim 6, wherein said high frequency component compression factor and said frame rate compression factor are also used to ensure that said original video signal is compressed within said predetermined period of time.

8. A video and audio signal compressing device for compressing an original video signal and an original audio signal synchronized with each other collectively into a compressed video and audio signal comprising a compressed video signal and a compressed audio signal synchronized with each other, said original video signal comprising original images, wherein said compressing device comprises:

table keeping means for keeping a compression data table, wherein said compression data table comprises a high frequency component compression factor and a frame rate compression factor;

video encoding means for encoding input images into presubsampled video codes;

audio encoding means for encoding said original audio signal into audio codes used as said compressed audio signal;

high frequency component compressing means for compressing high frequency components of said original images into high frequency component compressed images in compliance with said high frequency compression factor;

supply means for supplying said high frequency component compressed images to said video encoding means as said input images to produce said presubsampled video codes; and subsampling means for subsampling said presubsampled video codes in compliance with said frame rate compression factor into subsampled video codes used as said compressed video signal, wherein said high frequency component compressing means compresses said original images into high frequency component compressed images based on said high frequency component compression factor to ensure that said original video signal is compressed within a predetermined period of time.

9. A video and audio signal compressing device as claimed in claim 8, wherein said high frequency component compressing factor is used to compress said original video signal within said predetermined period of time in order to synchronize said compressed video signal and said compressed audio signal with each other.

10. A video and audio signal compressing device as claimed in claim 9, wherein said high frequency component compressing means comprises:

discrete cosine transform processing means for subjecting said original images to discrete cosine transform to produce discrete cosine transform processed images in compliance with said high frequency component compressing factor; and quantizing means for quantizing said discrete cosine transform processed images in compliance with said high frequency component compressing factor into quantized images for use as said high frequency component compressed images.

11. A video and audio signal compressing device as claimed in claim 10, each of picture elements of said original images being featured by one of color components consisting of a luminance, a red color difference, and a blue color difference, said compression data table additionally indicating a color component compression factor indicative of compression of said original images in compliance with the color components of their picture elements, wherein said discrete cosine transform processing means comprises:

color component processing means for processing said original images into color processed images of a selected color component selected from said color components to always comprise said luminance; and component discrete cosine transform processing means for subjecting said color processed images to discrete cosine transform to produce said discrete cosine transform processed images in compliance with said high frequency component compression factor.

12. A compressed video and audio signal expanding device for expanding a compressed video and audio signal separately into a video reproduction and an audio reproduction representative of original images of an original video signal and an original audio signal, said compressed video and audio signal being a succession of subsampled frames and indicating a frame rate compression factor and an indicated high frequency component compression factor, each of said subsampled frames comprising a subsampled video code and a subsampled audio code synchronized with each other with high frequency components of said original images compressed in said subsampled video code, said expanding device comprising:

table keeping means for keeping a compression data table indicative of a plurality of high frequency component compression factors;

frame interpolating means for interpolating additional frames in said subsampled frames in compliance with said frame rate compression factor to produce presubsampled frames comprising reproduced video codes and reproduced audio codes into which the subsampled video codes and the subsampled audio codes of said subsampled frames are expanded;

audio decoding means for decoding said reproduced audio codes into said audio reproduction;

video decoding means for decoding said reproduced video codes into high frequency component excluded images;

high frequency component recovering means for recovering high frequency components of said high frequency component excluded images to produce reproduced images, wherein said high frequency component recovering means recovers said high frequency components based on one of said plurality of high frequency component compression factors of said compression data table that is selected in accordance with said indicated high frequency component compression factor, wherein said one of said plurality of high frequency component compression factors is selected by said compressed video and audio signal expanding device to ensure that said compressed video signal is expanded within a predetermined time; and video reproducing means for reproducing from said reproduced images said video reproduction with synchronism kept between said video reproduction and said audio reproduction.

13. A compressed video and audio signal expanding device as claimed in claim 12, wherein said video reproduction is synchronized with said audio reproduction as a result of said compressed video signal being expanded within said predetermined time and wherein said one of said plurality of high frequency component compression factors is selected to ensure that said compressed video signal is expanded within said predetermined time.

14. A compressed video and audio signal expanding device as claimed in claim 13, wherein said high frequency component recovering means comprises:

dequantizing means for dequantizing said high frequency component excluded images, in accordance with a first selected one of the high frequency component compression factors of said compression data table that is selected in accordance with said indicated high frequency component compression factor, to produce dequantized images; and inverse discrete cosine transform processing means for subjecting said dequantized images to inverse discrete cosine transform, in accordance with a second selected one of the high frequency component compression factors of said compression data table that is selected in accordance with said indicated high frequency component compression factor, to produce inverse discrete cosine transform processed signal for use as said high frequency component recovered images.

\* \* \* \* \*